US012140892B2

(12) United States Patent
Doda

(10) Patent No.: US 12,140,892 B2
(45) Date of Patent: Nov. 12, 2024

(54) IMAGE FORMING APPARATUS

(71) Applicant: CANON KABUSHIKI KAISHA, Tokyo (JP)

(72) Inventor: Kazuhiro Doda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/346,957

(22) Filed: Jul. 5, 2023

(65) Prior Publication Data

US 2023/0350328 A1 Nov. 2, 2023

Related U.S. Application Data

(63) Continuation of application No. 17/684,806, filed on Mar. 2, 2022, now Pat. No. 11,740,576.

(30) Foreign Application Priority Data

Mar. 12, 2021 (JP) ................................ 2021-040563

(51) Int. Cl.
*G03G 15/20* (2006.01)

(52) U.S. Cl.
CPC ................................ *G03G 15/2039* (2013.01)

(58) Field of Classification Search
CPC ................................................. G03G 15/2039
See application file for complete search history.

(56) References Cited

U.S. PATENT DOCUMENTS 6,151,462 A 11/2000 Fukuzawa et al.
6,246,843 B1 * 6/2001 Nanataki ................ H05B 6/145 399/334
9,244,397 B2 1/2016 Takami
10,969,712 B2 4/2021 Sako et al.
2017/0023895 A1 * 1/2017 Tsubotani .......... G03G 15/5004

FOREIGN PATENT DOCUMENTS

JP 2006301110 A 11/2006
JP 2009186752 A 8/2009
JP 2013117551 A 6/2013
JP 2018017910 A 2/2018

OTHER PUBLICATIONS

Japanese Office Action issued on Sep. 17, 2024 in counterpart Japanese Patent Appln. No. 2021-040563.

* cited by examiner

*Primary Examiner* — Stephanie E Bloss
*Assistant Examiner* — Michael A Harrison
(74) *Attorney, Agent, or Firm* — Venable LLP

(57) ABSTRACT

An image forming apparatus includes a fixing unit including a tubular film, a pressure roller, and a heater including a heating element. The apparatus further includes a control unit configured to calculate an accumulated electrical energy supplied to a portion of the heating element. The portion of the heating element is located in an area corresponding to a second area of the nip portion. The second area is an area of the nip portion through which the recording material conveyed to the nip portion is not passed. The control unit is configured to determine an operation of heat leveling, which is performed for leveling a heat distribution in the nip portion after the recording material had passed the nip portion, based on the calculated accumulated electrical energy.

8 Claims, 16 Drawing Sheets

IMAGE FORMING APPARATUS

BACKGROUND OF THE INVENTION

Field of the Invention

The present invention relates to image forming apparatuses equipped with a fixing unit.

Description of the Related Art

Electrophotographic image forming apparatuses such as a laser printer, a copying machine, or a facsimile are equipped with a fixing unit for fixing a toner image transferred to a recording material. A film-heating-type fixing unit is composed of a fixing film and a pressure roller that comes into contact with the fixing film, and a heater substrate is provided in the fixing film. The film-heating-type fixing unit has a low heat capacity, so that when power is supplied to the heater substrate, parts such as the fixing film can be heated to a predetermined temperature condition in a short time. Therefore, the film-heating-type fixing unit is a fixing unit that has an advantageously short first printout time (FPOT).

Meanwhile, in a case where recording materials having a small sheet width, which is a length in a direction orthogonal to a conveyance direction, are passed through the fixing unit continuously, a non-sheet-passing portion, which is an area of the fixing film and the pressure roller where the recording material does not pass, reaches a higher temperature compared to a sheet-passing portion, which is an area where the recording material passes. In this state, if a recording material having a large sheet width passes the fixing unit, the recording material will be in an excessively heated state at the area corresponding to the non-sheet-passing portion of the fixing film, and image defects such as hot offsets may occur.

For example, Japanese Patent Application Laid-Open Publication No. H11-73055 proposes a method of avoiding the occurrence of hot offsets. In the image forming apparatus illustrated in Japanese Patent Application Laid-Open Publication No. H11-73055, a number of recording materials having a small sheet width that had passed through the fixing unit is counted, wherein if a count value exceeds a certain number, a period of rotation of a pressure roller is increased to cool the fixing unit after the recording material having a small sheet width had passed through. Thereby, a temperature of the non-sheet-passing portion of a fixing member of the fixing unit is lowered, and the occurrence of hot offsets can be avoided even if a large-size recording material is passed through the fixing unit after the small-size recording material had passed through.

However, according to the method proposed in Japanese Patent Application Laid-Open Publication No. H11-73055 mentioned above, there may be a case in which the method cannot respond flexibly to grammage, i.e., weight per unit area, of the recording material or change of sheet width of the recording material. For example, in a case where the grammage of the recording material is great, that is, the recording material is heavy, electric power supplied to a heater serving as a heat source becomes high, and electric power supplied to the non-heat-passing portion of the heater also becomes high, so that the speed of rising of the temperature of the non-sheet-passing portion becomes fast. Further, since the electric energy supplied to the non-sheet-passing portion of the heater becomes high, the temperature of the non-passing-portion of the fixing member, i.e., fixing film, rises. Meanwhile, if the grammage of the recording material is small, that is, the recording material is light, the electric power supplied to the heater serving as the heat source is low, and the electric power supplied to the non-sheet-passing portion becomes low, so that the speed of rising of temperature of the non-sheet-passing portion becomes slow. Further, if the sheet width of the recording material is small, the electric power supplied to the non-sheet-passing portion becomes high, and the speed of rising of temperature of the non-sheet-passing portion becomes fast. Meanwhile, if the sheet width of the recording material is great, the electric power supplied to the non-sheet-passing portion becomes small, and the speed of rising of temperature of the non-sheet-passing portion becomes slow.

According to the image forming apparatus of Japanese Patent Application Laid-Open Publication No. H11-73055 mentioned above, as the number of sheets of recording material having passed through the fixing unit increases, the period of rotation of the pressure roller abutting against the fixing member is increased to cool the fixing member, i.e., fixing film, of the fixing unit. However, according to this method, it is difficult to deal with the differences in temperature rising speed of the non-sheet-passing portion caused by the differences in grammage or width of the recording material. Therefore, if the temperature rising speed of the non-sheet-passing portion is too fast, hot offsets may occur, whereas if the temperature rising speed is too slow, the period of rotation of the pressure roller for cooling the fixing member, i.e., fixing film, will be performed longer than necessary.

SUMMARY OF THE INVENTION

According to one aspect of the invention, an image forming apparatus includes a fixing unit including a tubular film, a pressure roller abutting against an outer circumference surface of the film to form a nip portion, and a heater including a heating element, wherein the fixing unit is configured to fix a toner image to a recording material by heating the toner image on the recording material with the heater at the nip portion, and a control unit configured to calculate an accumulated electrical energy supplied to a portion of the heating element, wherein the portion of the heating element is located in an area corresponding to a second area of the nip portion, wherein a first area of the nip portion is an area through which the recording material conveyed to the nip portion is passed and the second area of the nip portion is an area through which the recording material conveyed to the nip portion is not passed, and wherein the control unit is configured to determine an operation of heat leveling, which is performed for leveling a heat distribution in the nip portion after the recording material had passed the nip portion, based on the calculated accumulated electrical energy.

Further features of the present invention will become apparent from the following description of exemplary embodiments with reference to the attached drawings.

DESCRIPTION OF THE EMBODIMENTS

Embodiments of the present disclosure will now be described in detail with reference to the drawings. In the following description, passing a sheet, or sheet-passing, refers to passing a recording material through a fixing nip portion of a fixing unit. Further, within an area in which a heating element generates heat, an area where the recording material does not pass is called a non-sheet-passing area, or non-sheet-passing portion, and the area where the recording material passes is called a sheet-passing area, or sheet-passing portion. Further, a phenomenon in which the temperature of the non-sheet-passing area becomes higher than the sheet-passing area is called a temperature rise in non-sheet-passing portion.

First Embodiment

General Configuration of Image Forming Apparatus

Figure 1:
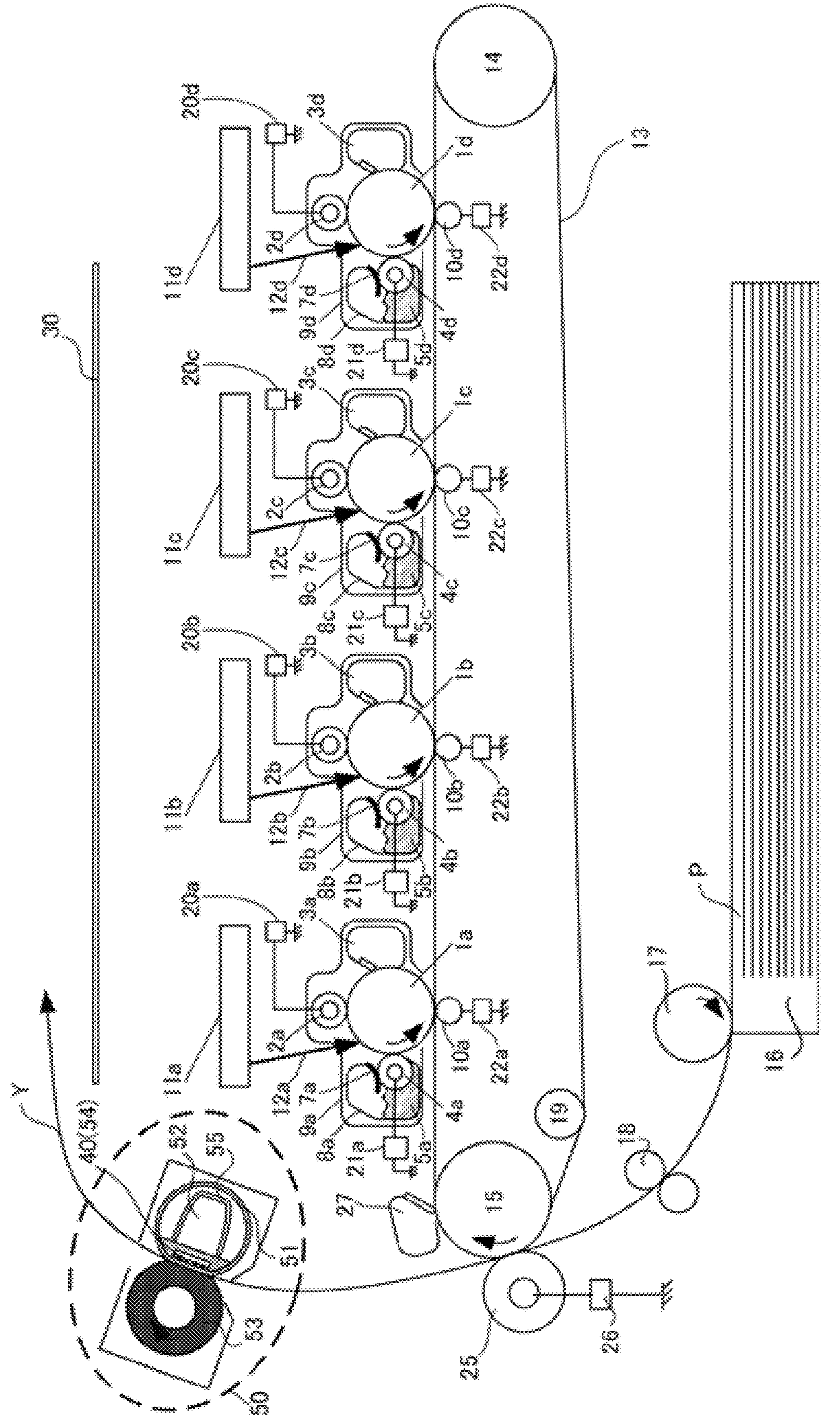
FIG. 1 is a cross-sectional view illustrating a configuration of an image forming apparatus according to first to fourth embodiments.

FIG. 1 is a cross-sectional view illustrating a configuration of a color image forming apparatus adopting an in-line system, which serves as one example of an image forming apparatus equipped with a fixing unit according to the first embodiment. A configuration of an electrophotographic color image forming apparatus will be described with reference to FIG. 1. A first station is a station for forming a yellow (Y) toner image, and a second station is a station for forming a magenta (M) toner image. A third station is a station for forming a cyan (C) toner image, and a fourth station is a station for forming a black (K) toner image.

In the first station, a photosensitive drum 1*a* serving as an image bearing member is an organic photoconductor (OPC) photosensitive drum. The photosensitive drum 1*a* is formed by laminating multiple layers of functional organic materials including, for example, a carrier generation layer formed on a metal cylinder and generating charge by exposure, and a charge transport layer for transporting generated charge, wherein an outermost layer has a low electrical conductivity and is approximately insulated. A charging roller 2*a* serving as a charging unit abuts against the photosensitive drum 1*a*, and it is rotated along with a rotation of the photosensitive drum 1*a* to uniformly charge a surface of the photosensitive drum 1*a*. A voltage having superposed a DC voltage or an AC voltage is applied to the charging roller 2*a*, and a discharge occurs in a minute air gap formed upstream and downstream, in a direction of rotation of the photosensitive drum 1*a*, of a nip portion between the charging roller 2*a* and the photosensitive drum 1*a*, thereby the photosensitive drum 1*a* is charged. A cleaning unit 3*a* is a unit for cleaning toner remaining on the photosensitive drum 1*a* after performing transfer described below. A developing unit 8*a* serving as a developing unit accommodates nonmagnetic one-component toner 5*a* and includes a developing roller 4*a* and a developer application blade 7*a*. The photosensitive drum 1*a*, the charging roller 2*a*, the cleaning unit 3*a*, and the developing unit 8*a* are accommodated in an integrated process cartridge 9*a* that is detachably attached to the image forming apparatus.

An exposing unit 11*a* serving as an exposure unit is composed of a scanner unit that reflects laser light by a rotary polygon mirror and scans the surface of the photosensitive drum 1*a* or of a light emitting diode (LED) array and irradiates a scanning beam 12*a* modulated based on an image signal to the surface of the photosensitive drum 1*a*. Further, the charging roller 2*a* is connected to a charging high-voltage power supply 20*a* serving as a voltage supply unit for the charging roller 2*a*. The developing roller 4*a* is connected to a developing high-voltage power supply 21*a* serving as a voltage supply unit to the developing roller 4*a*. A primary transfer roller 10*a* is connected to a primary transfer high-voltage power supply 22*a* serving as a voltage supply unit to the primary transfer roller 10*a*. The above description illustrates the configuration of the first station, and the second, third, and fourth stations adopt a similar configuration. The components of the other stations that have the same functions as the first station are denoted with the same reference numbers, and suffix b, c, and d are added to the reference numbers for the respective stations. In the present description, unless a specific station is described, the suffixes a, b, c, and d are omitted.

An intermediate transfer belt 13 is supported by three rollers that serve as stretching members, which are a secondary transfer opposing roller 15, a tension roller 14, and an auxiliary roller 19. A force in a direction tensioning the intermediate transfer belt 13 is applied via a spring (not shown) only to the tension roller 14, so that an appropriate tension force is maintained in the intermediate transfer belt 13. The secondary transfer opposing roller 15 rotates by receiving rotational drive from a main motor (not shown), by which the intermediate transfer belt 13 wound around an outer circumference thereof is rotated. The intermediate transfer belt 13 moves at approximately a same speed in an arrow direction (for example, a clockwise direction in FIG. 1) with respect to the photosensitive drums 1*a* to 1*d* (which rotate in a counterclockwise direction in FIG. 1, for example). Further, a primary transfer roller 10 is arranged at a position opposing the photosensitive drum 1 interposing the intermediate transfer belt 13, and it is driven to rotate following the movement of the intermediate transfer belt 13. A position at which the photosensitive drum 1 and the primary transfer roller 10 abut against each other interposing the intermediate transfer belt 13 is referred to as a primary transfer position. The auxiliary roller 19, the tension roller 14, and the secondary transfer opposing roller 15 are electrically grounded. Further, also according to the second to fourth stations, the primary transfer rollers 10*b* to 10*d* adopt a similar configuration as the primary transfer roller 10*a*, so that the descriptions thereof are omitted.

Figure 2:
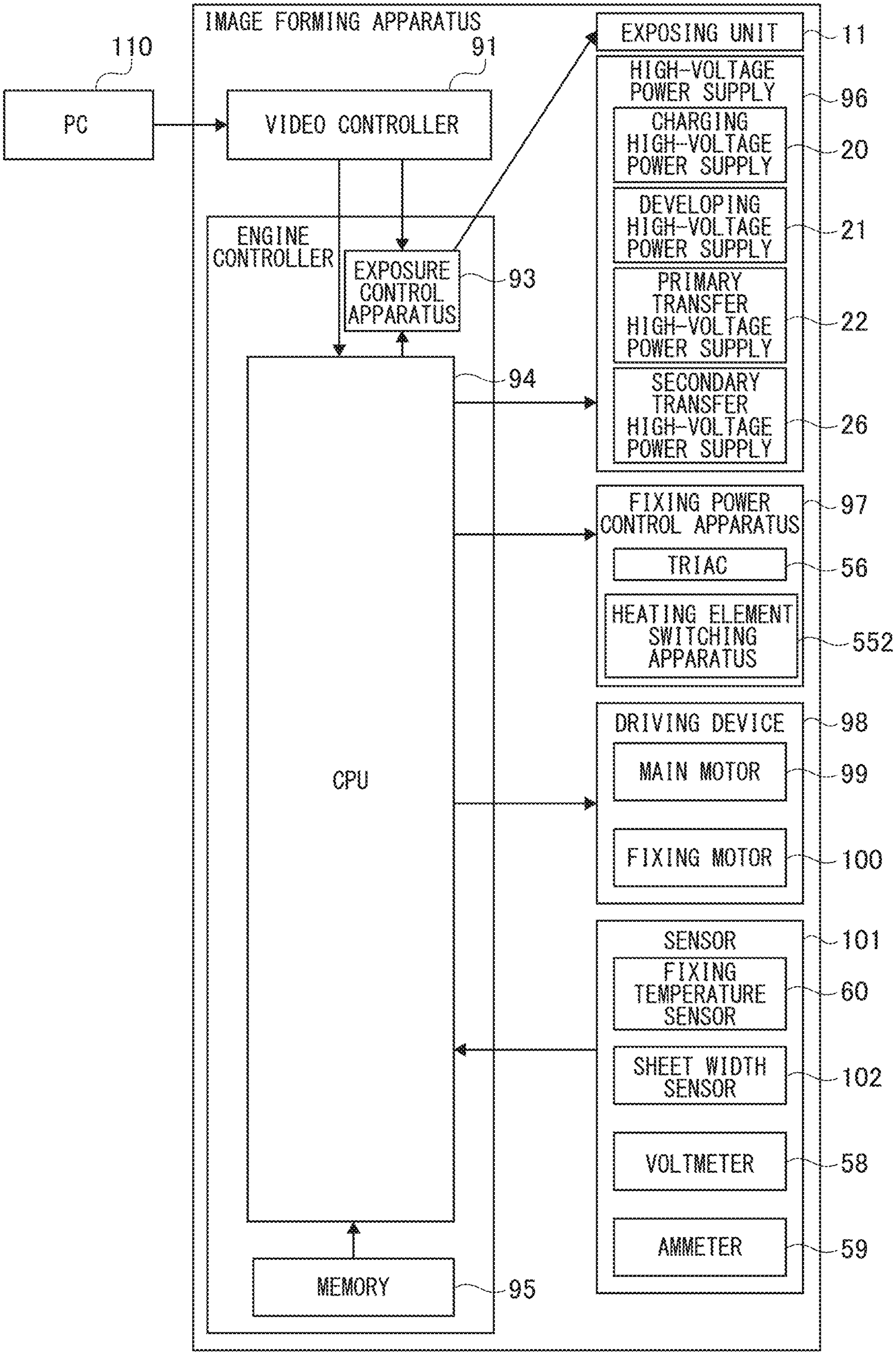
FIG. 2 is a block diagram illustrating a configuration of a control unit of the image forming apparatus according to the first to fourth embodiments.

Next, an image forming operation according to the image forming apparatus illustrated in FIG. 1 will be described. When a print command is received during standby, the image forming apparatus starts an image forming operation. The photosensitive drum 1 and the intermediate transfer belt 13 start to rotate in the arrow direction in the drawing at a predetermined processing speed by a main motor (FIG. 2). The photosensitive drum 1*a* is charged uniformly by the charging roller 2*a* to which voltage has been applied from the charging high-voltage power supply 20*a*, and thereafter, an electrostatic latent image is formed based on an image information by a scanning beam 12*a* irradiated from the exposing unit 11*a*. Toner 5*a* inside the developing unit 8*a* is charged to negative polarity by the developer application blade 7*a* and applied to the developing roller 4*a*. A predetermined developing voltage is applied from the developing high-voltage power supply 21*a* to the developing roller 4*a*. In a state where the photosensitive drum 1*a* rotates and the electrostatic latent image formed on the photosensitive drum 1*a* reaches the developing roller 4*a*, toner having a negative polarity is attached to the electrostatic latent image to visualize the image, and a toner image of a first color (such as yellow (Y)) is formed on the photosensitive drum 1*a*. The other stations (the process cartridges 9*b* to 9*d*) corresponding to other colors (magenta (M), cyan (C), and black (K)) operate similarly. Write signals from a controller (not shown) are delayed according to the timings corresponding to the distances between the primary transfer positions of each of the colors, and the electrostatic latent images formed by scanning beams 12 from exposing units 11 are formed on each of the photosensitive drums 1*a* to 1*d*. A DC high voltage of an opposite polarity as toner is applied to each of the primary transfer rollers 10*a* to 10*d*. Thereby, the toner images on the photosensitive drums 1*a* to 1*d* are sequentially transferred to the intermediate transfer belt 13 (hereinafter referred to as primary transfer), and a multilayer toner image is formed on the intermediate transfer belt 13.

Thereafter, at a matched timing with the creation of the toner image, a sheet P serving as a recording material supported on a cassette 16 is fed, or picked up, by a sheet feed roller 17 driven to rotate by a sheet feed solenoid (not shown). The sheet P being fed is conveyed by a conveyance roller (not shown) to a registration roller 18. The sheet P is conveyed to a transfer nip portion, which is a contact portion between the intermediate transfer belt 13 and a secondary transfer roller 25, by the registration roller 18 in synchronization with the toner image on the intermediate transfer belt 13. A voltage having an opposite polarity as toner is applied to the secondary transfer roller 25 from a secondary transfer high-voltage power supply 26, and a multilayer toner image of four colors borne on the intermediate transfer belt 13 is transferred collectively to the sheet P, that is, on the recording material (hereinafter referred to as secondary transfer). Meanwhile, toner remaining on the intermediate transfer belt 13 after the secondary transfer is cleaned by a cleaning unit 27. The sheet P to which secondary transfer has been completed is conveyed to a fixing unit 50, and the sheet P to which the toner image has been fixed is discharged onto a discharge tray 30 as a product having an image printed or copied thereto. A fixing film 51, a nip forming member 52, a pressure roller 53, and a heater 40 of the fixing unit 50 will be described below.

Control Block Diagram of Image Forming Apparatus

FIG. 2 is a block diagram illustrating a configuration of a control unit of the image forming apparatus, and a printing operation of the image forming apparatus will be described with reference to the drawing. A PC 110 serving as a host computer transmits a print command containing image data and print information of a print image to a video controller 91 arranged in the image forming apparatus.

The video controller 91 converts the image data received from the PC 110 into exposure data, transfers the exposure data to an exposure control apparatus 93 within an engine controller 92, and transmits a print command to a CPU 94. The exposure control apparatus 93 is controlled by the CPU 94 and controls an exposing unit 11 that turns a laser light on and off according to the exposure data. The CPU 94 serving as a control unit starts an image forming operation when a print command is received from the video controller 91.

The CPU 94 and a memory 95 are installed in the engine controller 92. The CPU 94 operates according to a program stored in advance in the memory 95. Further, the CPU 94 includes a timer for measuring time, and the memory 95 stores various information for controlling the fixing unit 50 described below. A high-voltage power supply 96 is composed of the charging high-voltage power supply 20, the developing high-voltage power supply 21, the primary transfer high-voltage power supply 22, and the secondary transfer high-voltage power supply 26 described earlier. A fixing power control apparatus 97 includes a bidirectional thyristor (hereinafter referred to as triac) 56 serving as a supply control unit, and a heating element switching apparatus 552 (refer to FIG. 11) serving as a switching unit for exclusively selecting a heating element to which power is supplied. The fixing power control apparatus 97 selects the heating element to which power is suppled in the fixing unit 50 and determines electric power to be supplied to the selected heating element.

A driving device 98 includes a main motor 99 and a fixing motor 100. Further, a sensor 101 includes a fixing temperature sensor 60 which is a temperature detection unit for detecting temperature of the fixing unit 50, a sheet width sensor 102 for detecting a width of the sheet P, a voltmeter 58, and an ammeter 59, and a detection result of the sensor 101 is transmitted to the CPU 94. The CPU 94 acquires a detection result of the sensor 101 within the image forming apparatus, and based on the detection result, controls the exposing unit 11, the high-voltage power supply 96, the fixing power control apparatus 97, and the driving device 98. Thereby, the CPU 94 forms the electrostatic latent image, transfers the developed toner image to the sheet P, and fixes the transferred toner image to the sheet P, and performs control of an image forming process in which the image data received from the PC 110 is printed as toner image on the sheet P. The image forming apparatus is not limited to the image forming apparatus having the configuration illustrated in FIG. 1, and it can be an image forming apparatus having different configuration and equipped with the fixing unit 50 having the heater 40 described below and capable of printing images on sheets P having different widths.

Configuration of Fixing Unit

Figure 3A:
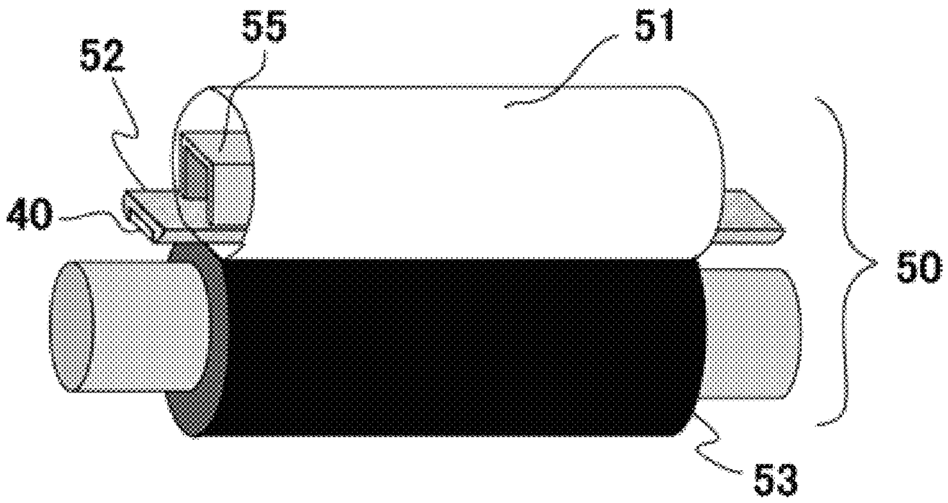
FIGS. 3A and 3B are each a cross-sectional view illustrating a configuration of a fixing unit according to the first to fourth embodiments.
Figure 3B:
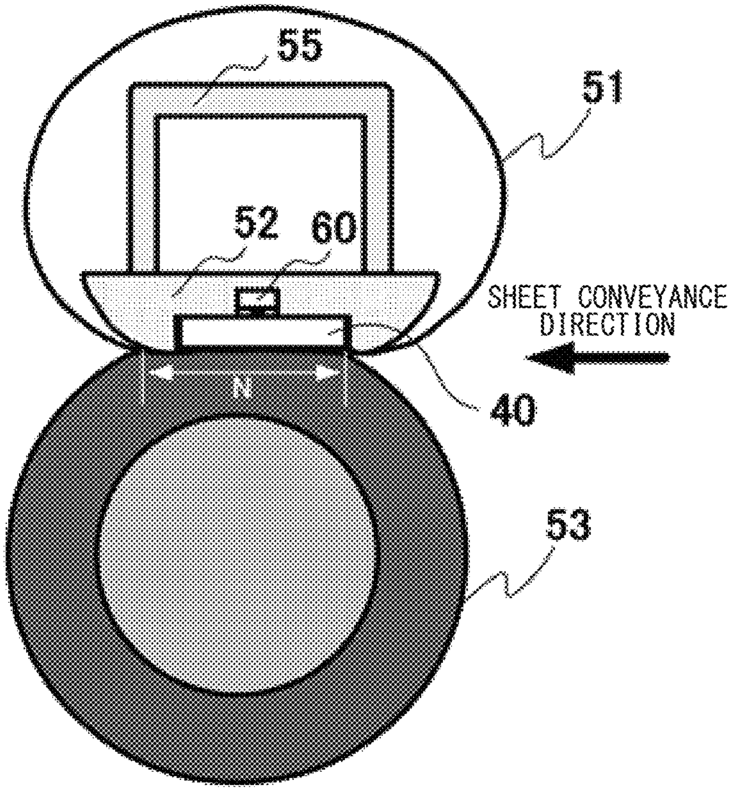

FIGS. 3A and 3B illustrate a configuration of the fixing unit 50 used in the image forming apparatus according to the present embodiment. FIG. 3A is a perspective view illustrating a configuration of the fixing unit 50, and FIG. 3B is a cross-sectional view in which the fixing unit 50 illustrated in FIG. 3A is cut at a center in a longitudinal direction thereof.

The fixing unit 50 is composed of the tubular fixing film 51, the pressure roller 53 that forms the fixing nip portion N together with the fixing film 51, the heater 40 for heating the fixing film 51, the nip forming member 52 for holding the heater 40, and a stay 55 for improving strength (stiffness) of the unit in a longitudinal direction.

The fixing film 51 includes a polyimide substrate having a film thickness of 50 μm a silicon rubber layer having a film thickness of 200 μm formed thereon, and a perfluoroalkoxy alkane (PFA) release layer having a film thickness of 20 μm formed thereon. The pressure roller 53 includes a core metal made of free machining steel (e.g., SUM grade in Japanese Industrial Standards) and having an outer diameter of 13 mm, a silicon rubber elastic layer having a film thickness of 3.5 mm, and a PFA release layer having a film thickness of 40 μm formed thereon. By rotating the pressure roller 53 by a driving source (not shown), the fixing film 51 receives drive of the pressure roller 53 and is driven to rotate. The heater 40 serving as a heating member is arranged in an interior space of the fixing film 51 and retained by the nip forming member 52 so that an inner circumference surface of the fixing film 51 is in contact with a surface of the heater 40. Both ends of the stay 55 press the nip forming member 52, and the pressing force thereof is applied via the nip forming member 52 and the fixing film 51 to the pressure roller 53. Thereby, the fixing nip portion N is formed by the outer circumference surface of the fixing film 51 and the pressure roller 53 being in pressure contact with each other, and the fixing film 51 is nipped by the pressure roller 53 and the heater 40. The sheet P is fed to the fixing nip portion N from the illustrated sheet conveyance direction. The nip forming member 52 is required to have stiffness, heat resistance, and heat insulation property, and it is formed of a liquid crystal polymer.

The fixing temperature sensor 60, which according to the present embodiment is a thermistor, serving as a temperature detection unit, and a thermo-switch (thermal switch, not shown) serving as a safety element are arranged in contact with a rear surface, which is opposite from the side facing the fixing film 51, of the heater 40 at a center portion of the rear surface in the longitudinal direction. The fixing temperature sensor 60 according to the present embodiment is a chip resistor-type thermistor (hereinafter referred to as a thermistor 60). The CPU 94 described above detects a resistance value of the thermistor 60 and performs a temperature control of the heater 40 based on a detection result of the resistance value. Further, the thermistor 60 is capable of detecting excessive temperature rise. Thermistors are arranged on both longitudinal end portions of the heater 40, which are capable of detecting a heater temperature of the heater 40 at both longitudinal end portions. The thermo-switch is a bimetal thermo-switch, the heater 40 and the thermo-switch are electrically connected, and in a case where the thermo-switch detects the excessive temperature rise of the heater 40, the bimetal in the interior of the thermo-switch operates and power supply to the heater 40 is cut off.

Heater Configuration

Figure 4A:
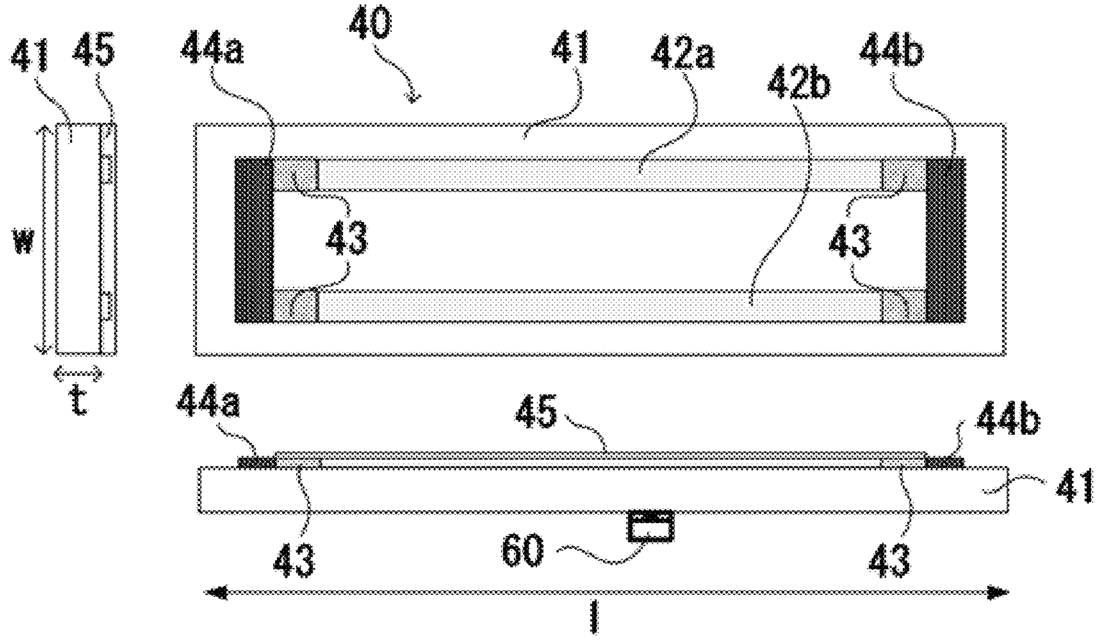
FIG. 4A is a view illustrating a configuration of a heater according to the first embodiment.

FIG. 4A is an explanatory view of a configuration of the heater 40 according to the present embodiment. In FIG. 4A, an upper right view is a top view illustrating the heater 40 from the pressure roller 53 side, and the left view is a cross-sectional view taken at a longitudinal center portion of the heater 40 illustrated on the right view. The lower view is a cross-sectional view taken at a center portion in a short-length direction of the heater 40 illustrated on the upper right view.

The heater 40 adopts a configuration in which heating elements 42*a* and 42*b* mainly composed of silver and palladium, a conductive path 43 having a lower resistance value than the heating elements 42*a* and 42*b*, and power supply contacts 44*a* and 44*b* are formed on a plate-shaped ceramic substrate 41 formed of alumina, for example. Areas other than the contacts 44*a* and 44*b* are coated with an insulative glass 45. When a voltage is applied between the power supply contacts 44*a* and 44*b*, the heating elements 42*a* and 42*b* on the ceramic substrate 41 generate heat. The dimensions of the ceramic substrate 41 are thickness t=1 mm, width w=7.0 mm, and length 1=280 mm. The heating elements 42*a* and 42*b* have the same longitudinal length of 222 mm and are arranged in parallel in a short-length direction of the ceramic substrate 41. A resistance value of each of the heating elements 42*a* and 42*b* is 21Ω, and the heating elements 42*a* and 42*b* are connected in parallel, so that a synthetic resistance value of the two heating elements 42*a* and 42*b* is 10.5Ω. As described above, the heating elements 42*a* and 42*b* and the conductive path 43 are coated with the glass 45, so that insulation is retained. The thermistor 60 that detects the temperature of the heater 40 via the ceramic substrate 41 is arranged at the longitudinal center portion of the ceramic substrate 41. The CPU 94 controls electric power to be supplied to the heating elements 42*a* and 42*b* based on the detection result of temperature of the heater 40 with the thermistor 60.

Figure 4B:
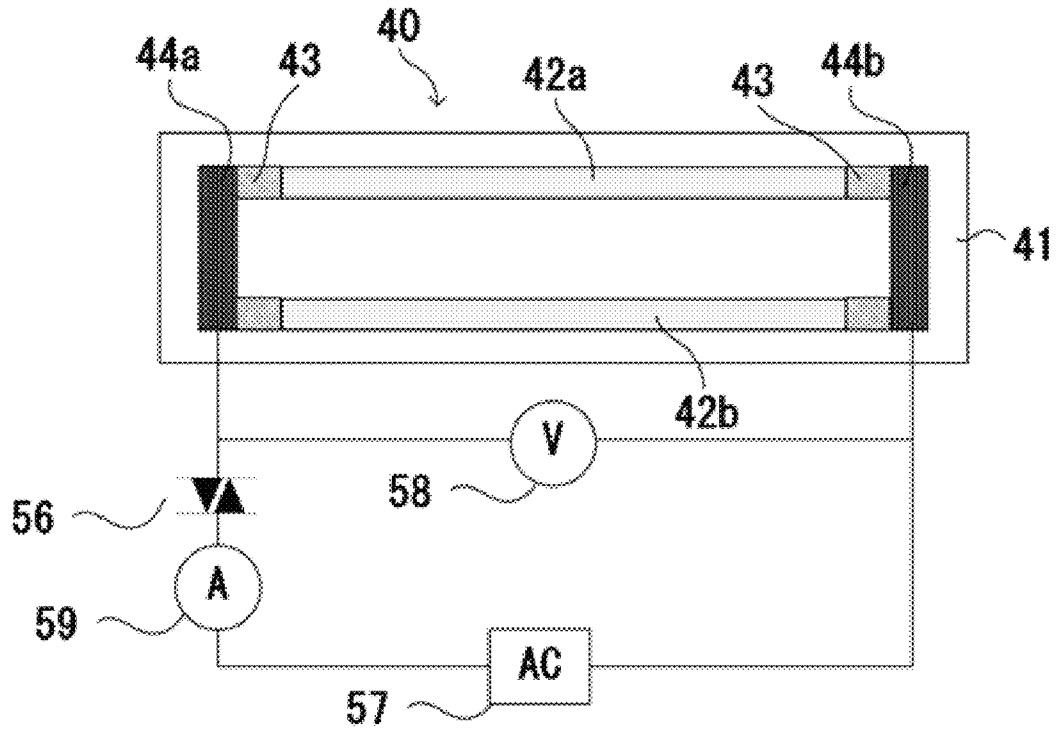
FIG. 4B is an explanatory view of a power supply path of the heater according to the first embodiment.

FIG. 4B is a schematic diagram illustrating a power supply path for supplying power to the heater 40 according to the present embodiment. As illustrated in FIG. 4B, power is supplied from an AC power supply 57 (denoted by AC in the drawing) via the power supply contacts 44*a* and 44*b* to the heating elements 42*a* and 42*b* of the heater 40. Further, the voltmeter 58 (denoted by V in the drawing) serving as a voltage detection unit for measuring a voltage applied to the heating elements 42*a* and 42*b* and the ammeter 59 (denoted by A in the drawing) serving as a current detection unit for measuring a current value flowing to the heating elements 42*a* and 42*b* are arranged in the power supply path. A triac 56 serving as a switch connects and disconnects a power supply path from the AC power supply 57 to the heating elements 42*a* and 42*b*. The CPU 94 performs PI control using a temperature information of the heater 40 detected by the thermistor 60 so that the fixing nip portion N is maintained at a predetermined temperature, and calculates a ratio, i.e., duty, of on/off time of the triac 56. The CPU 94 controls the triac 56 based on the calculated duty.

The present embodiment can shorten a cooling time of the pressure roller 53 according to the temperature of the non-sheet passing portion after a small-size sheet P is passed through by calculating the temperature of the fixing film 51 serving as the fixing member highly accurately. Further, the present embodiment can reduce an occurrence of a hot offset when the large-size sheet P is passed through after the small-size sheet P is passed through. Therefore, according to the present embodiment, the accumulated electrical energy supplied to the non-sheet-passing portion of the heater 40 is calculated, and the temperature of the non-sheet-passing portion of the fixing film 51 is calculated based on the calculated accumulated electrical energy. By calculating the temperature of the non-sheet-passing portion of the fixing film 51 accurately, the cooling time of the pressure roller 53 after the small-size sheet P had passed through can be set as short as possible. In the following description, examples of method for calculating the temperature of the fixing member of the present embodiment will be described.

Figure 5:
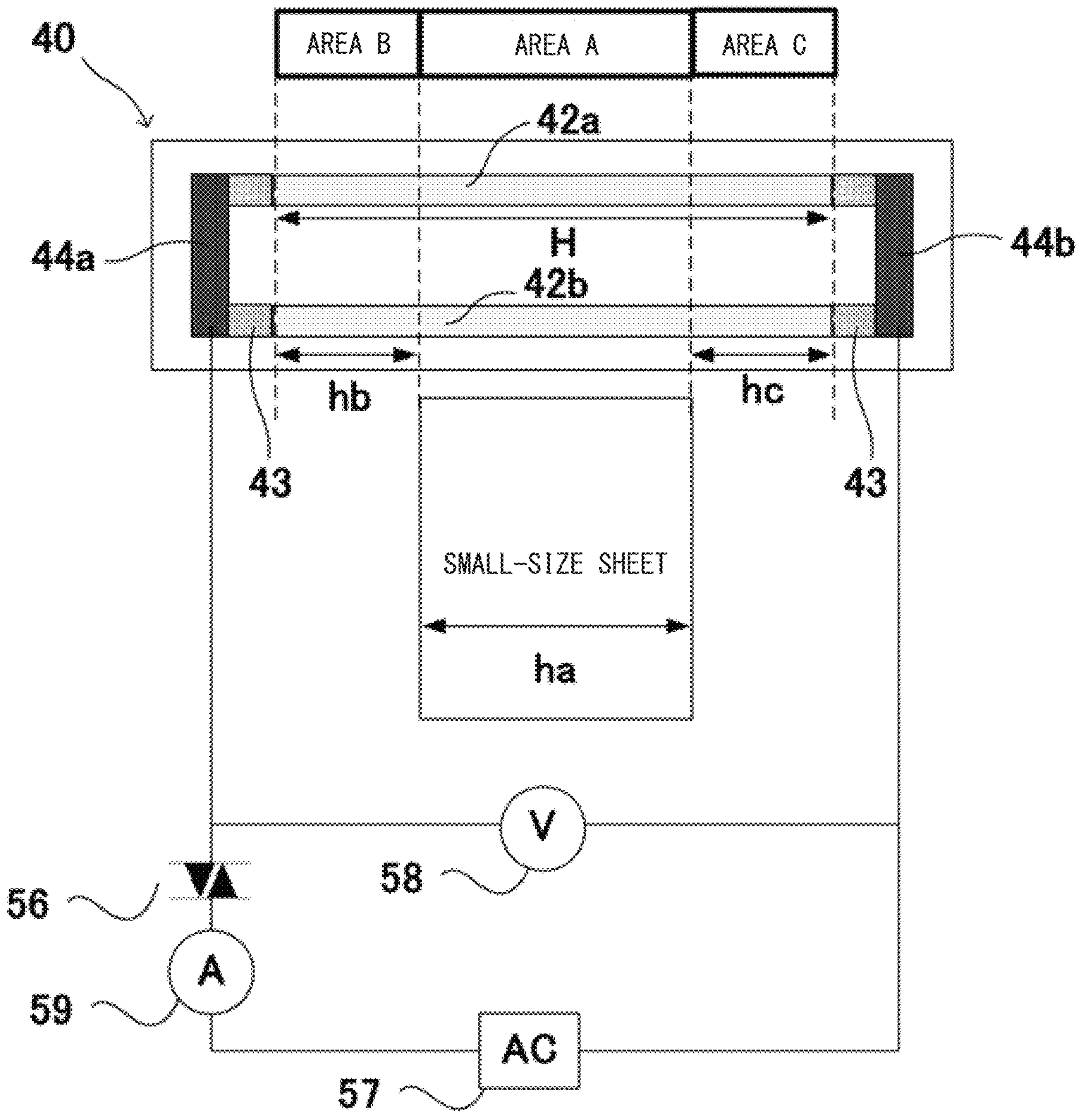
FIG. 5 is an explanatory view of a positional relationship between a heater and a sheet according to the first embodiment.

Sheet-passing Portion of Heater, and Electric Power Supplied to Non-Sheet-Passing Portion FIG. 5 is a view illustrating a positional relationship between the heater 40 and the small-size sheet P (denoted as small-size sheet in the drawing) with reference to FIG. 4B. In FIG. 5, a center in a width direction of the small-size sheet P is set to pass through a center of the longitudinal direction (right-left direction in the drawing) of the heating elements 42*a* and 42*b* of the heater 40. In the heating elements 42*a* and 42*b* illustrated in FIG. 5, an area of a sheet-passing portion through which the sheet P passes is denoted by area A, and one of the non-sheet-passing portions on either side of area A where the sheet P does not pass through is denoted by area B (non-sheet-passing portion on left side of drawing) and the other non-sheet-passing portion is denoted by area C (non-sheet-passing portion on right side of drawing). Further, a length in a longitudinal direction of the heating elements 42*a* and 42*b* of the heater 40 is denoted by H, a sheet width, i.e., length in a width direction, of the small-size sheet P is denoted by ha, a width in the longitudinal direction of area B serving as the non-sheet-passing portion is denoted by hb, and a width in the longitudinal direction of area C is denoted by hc. As described above, the sheet P is passed through the center in the longitudinal direction of the heating elements 42*a* and 42*b* of the heater 40, so that a width hb of area B and a width hc of area C have the same length. The sheet width ha can be determined based on a sheet size information of the sheet P included in a print information transmitted from the PC 110, or the sheet width ha of the sheet P can be determined based on the detection result of the sheet width sensor 102 equipped in the image forming apparatus.

Further according to the present embodiment, the electric power supplied to the heating elements 42*a* and 42*b* of the heater 40 is calculated based on a voltage information of a voltage applied to the heating elements 42*a* and 42*b* measured by the voltmeter 58 and a current information of a current flown to the heating elements 42*a* and 42*b* measured by the ammeter 59. The electric power supplied from the AC power supply 57 to the heating elements 42*a* and 42*b* of the heater 40 is denoted by WS, the electric power supplied to area A which is the sheet-passing portion of the heating elements 42 and 42*b* is denoted by WSa, and electric power supplied to area B and area C which are non-sheet-passing portions is respectively denoted by WSb and WSc. The electric power WS can be calculated by a following calculation formula, $$WS=WSa+WSb+WSc.$$

The electric power WSa of area A serving as a sheet-passing area can be calculated by a following calculation formula, $$WSa=WS\times ha/H.$$

Further, the electric power WSb of area B being a non-sheet-passing portion can be calculated by a following calculation formula, $$WSb=WS\times hb/H.$$

Similarly, the electric power WSc of area C being the non-sheet-passing portion can be calculated by a following calculation formula, $$WSc=WS\times hc/H.$$

The area widths hb and hc have the same length that can be calculated by a following calculation formula, $$hb=hc=(H-ha)/2.$$

According to the present embodiment, the electric power supplied to the non-sheet-passing portion of the heating element of the heater 40 is accumulated or integrated, and a risen temperature of the non-sheet-passing portion of the fixing member (hereinafter referred to as a risen temperature value) is calculated based on the accumulated value or an integral of electric power, i.e., an amount measured with a unit of W·s (watt-second) or J (joule). Such accumulated value is hereinafter referred to as an accumulated electrical energy. An accumulated electrical energy supplied to the heater 40 from the AC power supply 57 is denoted by IWS, an accumulated electrical energy supplied to area B of the non-sheet-passing portion is denoted by IWSb, and an accumulated electrical energy of area C of the non-sheet-passing portion is denoted by IWSc. In the present embodiment, the area widths hb and hc of areas B and C have the same length, so that the electrical energy supplied to area B and the electrical energy supplied to area C are the same. Therefore, the accumulated electrical energy at area B is calculated, the calculation of risen temperature value of area B is described, and the description of area C is omitted.

Risen Temperature Value of Non-Sheet-Passing Portion of Fixing Member and Transition of Accumulated Electrical Energy First, three types of sheets having different sheet widths were prepared to perform a continuous sheet passing test and to obtain a risen temperature value (maximum value) of the non-sheet-passing portion of the fixing member and an accumulated electrical energy IWSb of the non-sheet-passing portion at that time, to confirm whether there is a correlation between the accumulated electrical energy IWSb of area B and the risen temperature value of the non-sheet-passing portion. The sheet-passing conditions of the continuous sheet passing test are as follows. The sheet width ha of the three types of sheets L, M, and N were each 210 mm, 205 mm, and 200 mm, and the lengths in the conveyance direction and grammage of the sheets L, M, and N were each 297 mm and 128 g/m$^2$. In the continuous sheet passing test, temperature control was executed so that a detection temperature of the thermistor 60 arranged in contact with the heater 40 is maintained at 200° C., the conveyance speed of sheets was set to 200 mm/s, and the feed interval of the sheets was set to 0.2 s. The fixing member mentioned here is the fixing film 51 of the fixing unit 50.

Figure 6A:
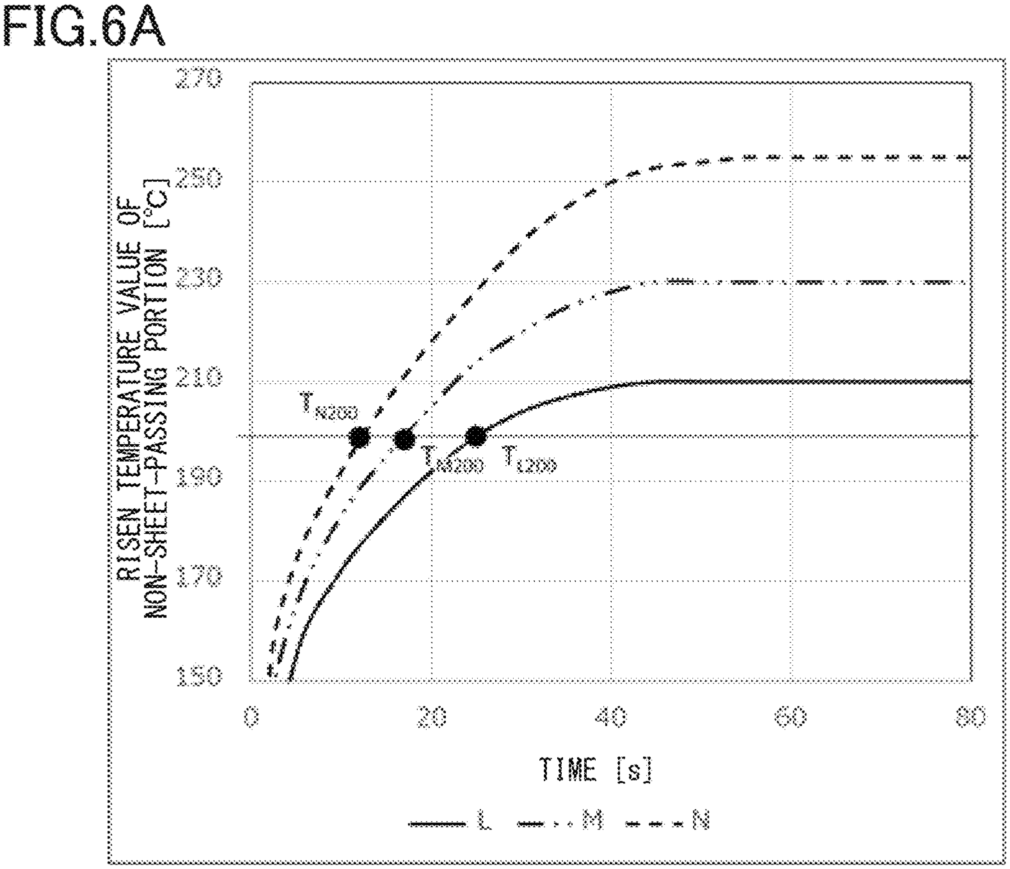
FIG. 6A is a view illustrating a relationship between a risen temperature value of a non-sheet-passing portion and a temperature rising time according to the first embodiment.

FIG. 6A is a graph illustrating a transition of risen temperature value of surface temperature of the non-sheet-passing portion area of the fixing film 51 in a state where sheets L, M, and N are passed continuously through the fixing nip portion N of the fixing unit 50. In FIG. 6A, a vertical axis indicates a risen temperature value (unit: ° C.) of the surface temperature of the non-sheet-passing portion of the fixing film 51, and a horizontal axis indicates time (unit: s). Further, a solid line in the graph shows a temperature variation when sheet L is subjected to continuous-sheet-passing operation, a two-dot chain line in the graph shows the temperature variation when sheet M is subjected to continuous-sheet-passing operation, and a dashed line in the graph shows the temperature variation when sheet N is subjected to continuous-sheet-passing operation.

In the drawing, points indicated by black dots show the time when the risen temperature value of the non-sheet-passing portion of the fixing film 51 has reached 200° C. when the sheets L, M, and N were subjected to continuous-sheet-passing operation. In FIG. 6A, the time $T_{L200}$ at which the risen temperature value of the non-sheet-passing portion of the fixing film 51 had reached 200° C. when sheet L was passed through was 26 s. Similarly, the time $T_{M200}$ and time $T_{N200}$ at which the risen temperature value of the non-sheet-passing portion of the fixing film 51 had reached 200° C. when sheet M and sheet N were passed through were 17 s and 12 s, respectively. As illustrated in FIG. 6A, the sheet N having the smallest sheet width had the fastest risen temperature speed of the fixing film 51, and the risen temperature value of the fixing film 51 was saturated at the highest temperature among the three types of sheets.

Figure 6B:
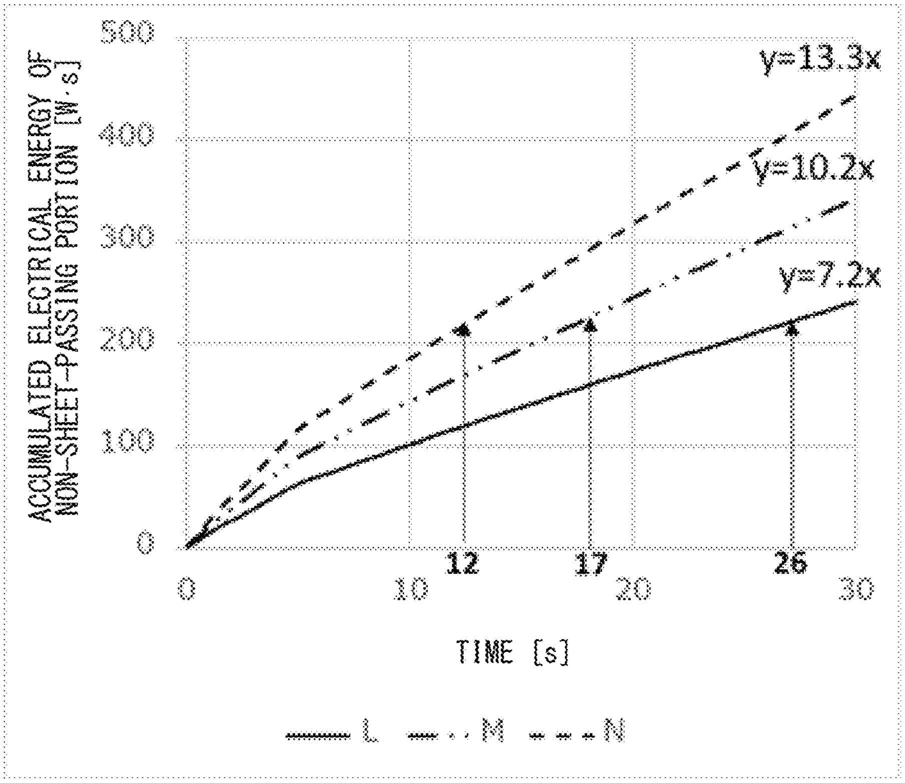
FIG. 6B is a view illustrating a relationship between an accumulated electrical energy of the non-sheet-passing portion and the temperature rising time according to the first embodiment.

FIG. 6A is a graph illustrating a transition of accumulated electrical energy IWSb in area B of the non-sheet-passing portion of the heating elements 42*a* and 42*b* in a state were sheets L, M, and N are continuously passed through the fixing nip portion N of the fixing unit 50. In FIG. 6B, the vertical axis shows an accumulated electrical energy IWSb (unit: W·s) supplied to area B serving as the non-sheet-passing portion of the heating elements 42*a* and 42*b*, and the horizontal axis shows time (unit: s). The solid line in the graph shows a change in the accumulated electrical energy IWSb when the sheets L were subjected to continuous-sheet-passing operation, the two-dot chain line in the graph shows the change in the accumulated electrical energy IWSb when the sheets M were subjected to continuous-sheet-passing operation, and the dashed line in the graph shows the change in the accumulated electrical energy IWSb when the sheets N were subjected to continuous-sheet-passing operation. As described above, the electric power WSb at area B of the non-sheet-passing portion can be calculated by a calculation formula of WSb=WS×hb/H. The accumulated electrical energy IWSb at area B can be calculated by accumulating the calculated electric power WSb.

As illustrated in FIG. 6A, the times at which the risen temperature value of the non-sheet-passing portion of the fixing film 51 had reached 200° C. when each of the sheets L, M, and N were subjected to continuous-sheet-passing operation were 26 s, 17 s, and 12 s, respectively. In FIG. 6B, the accumulated electrical energy IWSb at area B when 26 s, 17 s, and 12 s had respectively elapsed when sheets L, M, and N had been subjected to continuous-sheet-passing operation were 220 (W·s), 220 (W·s), and 215 (W·s), respectively, for sheets L, M, and N. That is, the accumulated electrical energies IWSb supplied to area B of the non-sheet-passing portion of the heating elements 42*a* and 42*b* when the sheets L, M, and N were subjected to continuous-sheet-passing operation until the surface temperature of the area of the non-sheet-passing portion of the fixing film 51 had reached 200° C. were approximately of the same value.

Further, the above-mentioned continuous sheet passing test was also performed regarding the correlation of the accumulated electrical energy IWSb supplied to area B of the non-sheet-passing portion of the heating elements 42*a* and 42*b* of cases where the surface temperatures of the non-sheet-passing portion area of the fixing film 51 were 190° C. and 180° C., respectively, to confirm whether correlation exists. As illustrated in FIG. 6A, the time at which the risen temperature value of the non-sheet-passing portion of the fixing film 51 had reached 190° C. when sheets L, M, and N were each subjected to continuous-sheet-passing operation were 19 s, 12 s, and 9 s, respectively. In FIG. 6B, the accumulated electrical energies IWSb at area B when 19 s, 12 s, and 9 s had elapsed after performing continuous-sheet-passing operation of sheet L, M, and N, respectively, were 165 (W·s), 170 (W·s), and 170 (W·s) for sheets L, M, and N, respectively. Further, as illustrated in FIG. 6A, the times at which the risen temperature value of the non-sheet-passing portion of the fixing film 51 had reached 180° C. when sheets L, M, and N had been subjected to continuous-sheet-passing operation were 14 s, 9 s, and 6 s, respectively. In FIG. 6B, the accumulated electrical energies IWSb at area B when 14 s, 9 s, and 6 s had elapsed after performing continuous-sheet-passing operation of sheets L, M, and N, respectively, were 130 (W·s), 135 (W·s), and 130 (W·s) for sheets L, M, and N, respectively. As a result, even in a case where the surface temperatures of the area corresponding to the non-sheet-passing portion of the fixing film 51 were 190° C. and 180° C., it was confirmed that there is a strong correlation with the accumulated electrical energy IWSb supplied to area B of the non-sheet-passing portion of the heating elements 42*a* and 42*b*.

Figure 7A:
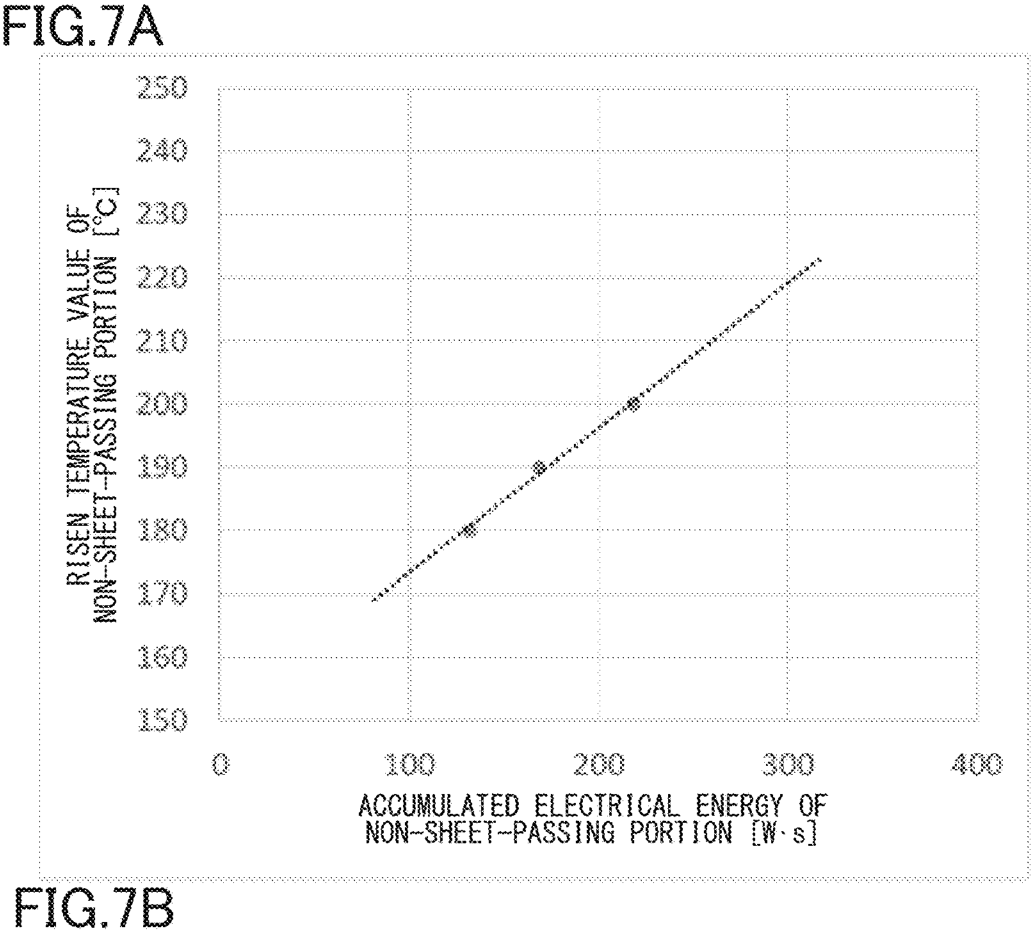
FIG. 7A is a graph illustrating a relational expression 1 according to the first embodiment.

FIG. 7A is a graph showing a relationship between a risen temperature value of the non-sheet-passing portion of the fixing film 51 and an accumulated electrical energy IWSb supplied to the non-sheet-passing portion of the heating elements 42*a* and 42*b* based on the result of the continuous sheet passing test mentioned above. A vertical axis (Y axis) shows a risen temperature value (unit: ° C.) of the non-sheet-passing portion of the fixing film 51, and a horizontal axis (X axis) shows an accumulated electrical energy (unit: W·s) supplied to area B of the non-sheet-passing portion of the heating elements 42*a* and 42*b*. The graph of FIG. 7A shows a straight line indicating an approximation that passes points plotting the accumulated electrical energy IWSb supplied to the non-sheet-passing portion of the heating elements 42*a* and 42*b* when the risen temperature value of the non-sheet-passing portion of the fixing film 51 were 180° C., 190° C., and 200° C. If the expression shown in the straight line of FIG. 7A is defined as relational expression 1 (first calculation formula), the relational expression 1 is represented by Y=0.23X+150. Alternatively, by creating a table associating the accumulated electrical energy IWSb supplied to the non-sheet-passing portion of the heating elements 42*a* and 42*b* and the risen temperature value of the non-sheet-passing portion of the fixing film 51 using the relational expression 1, the risen temperature value of the non-sheet-passing portion of the fixing film 51 can be calculated based on the accumulated electrical energy IWSb.

Further, according to the graph showing the risen temperature value of the non-sheet-passing portion of the fixing film 51 illustrated in FIG. 6A, it can be recognized that the risen temperature values of the non-sheet-passing portion of the fixing film 51 corresponding to sheets L, M, and N are each saturated to converge to a certain temperature. Specifically, the risen temperature values of the non-sheet-passing portion of the fixing film 51 of sheets L, M, and N are each saturated at 210° C., 230° C., and 255° C., respectively. In the document, this temperature is defined as a risen temperature saturation value or a saturation temperature. Next, a method for calculating the risen temperature saturation value will be described.

FIG. 6B is a graph showing a transition of the accumulated electrical energy IWSb at area B of the non-sheet-passing portion of the heating elements 42*a* and 42*b* when the sheets L, M, and N were subjected to continuous-sheet-passing operation. A ratio, or change rate, of variation of Y to variation of X, that is, an inclination α of the linear approximation expression, is calculated in a state where the graphs of sheets L, M, and N illustrated in FIG. 6B are shown by a linear approximation expression with the accumulated electrical energy shown in the vertical axis denoted by Y and the time shown in the horizontal axis denoted by X. The inclinations a according to sheets L, M, and N were 7.2, 10.2, and 13.3, respectively. The inclination of the graph where the elapsed time of passing of the sheets L, M, and N through the fixing nip portion N of the fixing unit 50 is 4 s or longer is calculated. Therefore, a linear expression indicating the accumulated electrical energies y of the sheets L, M, and N illustrated in FIG. 6B are each approximated by y=7.2x, y=10.2x, and y=13.3 x.

Figure 7B:
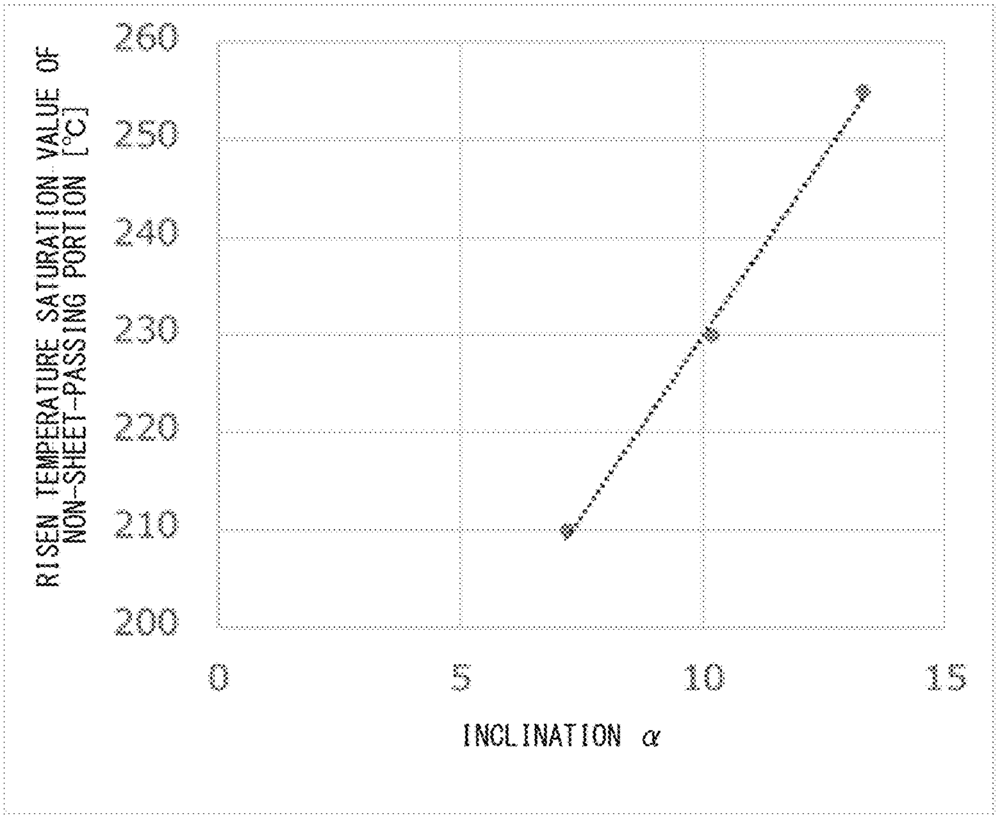
FIG. 7B is a graph illustrating a relational expression 2 according to the first embodiment.

FIG. 7B is a graph showing a relationship between the risen temperature saturation value of the non-sheet-passing portion of the fixing film 51 based on the continuous sheet passing test result described above and the inclination α calculated from the graph of FIG. 6B. A vertical axis (Y axis) of FIG. 7B shows the risen temperature saturation value (unit: ° C.) of the non-sheet-passing portion of the fixing film 51, and a horizontal axis (X axis) shows the inclination of the graph shown in FIG. 6B, that is, the variation of the accumulated electrical energy IWSb in area B of the non-sheet-passing portion of the sheet-passing time. The graph of FIG. 7B shows a straight line indicating an approximation that passes points plotting inclination α calculated by the graph of FIG. 6B for sheets L, M, and N in a state where the risen temperature saturation values are 210° C., 230° C., and 255° C., and it can be confirmed that there is a correlation between inclination α and the risen temperature saturation value. If the expression showing the relationship between the inclination α (X axis) and the risen temperature saturation value (Y axis) indicated in FIG. 7B is defined as a relational expression 2 (second calculation formula), the relational expression 2 can be represented by Y=7.4X+156.

Relationship between Accumulated Electrical Energy of Non-Sheet-Passing Portion of Heater and Risen Temperature Value of Non-Sheet-Passing Portion of Fixing Film Next, a method for calculating a relational expression 3 considering the risen temperature saturation value mentioned earlier will be described based on the relational expression 1 indicating the relationship between the accumulated electrical energy IWSb at area B of the non-sheet-passing portion of the heating elements 42*a* and 42*b* of the heater 40 illustrated in FIG. 7A and the risen temperature value of the non-sheet-passing portion of the fixing film 51. In the relational expression 1 illustrated in FIG. 7A, if the risen temperature value of the non-sheet-passing portion calculated by the relational expression 1 is higher than the above-mentioned risen temperature saturation value, a relational expression 3 for substituting the value of temperature rise in non-sheet-passing portion calculated by the relational expression 1 by the risen temperature saturation value is created. The example of a sheet P having a sheet width of 207 mm will be described as a specific example. The inclination α of a state in which the sheet P having a sheet width of 207 mm is passed through is 11. By substituting inclination α=11 (that is, X=11) to the relational expression 2 mentioned above, the risen temperature saturation value Y is calculated as 238° C. (≈7.4 [° C.]×11+156 [° C.]). Further, in the relational expression 1, the value of temperature rise in non-sheet-passing portion corresponding to the accumulated electrical energy in which the value of temperature rise in non-sheet-passing portion becomes higher than 238° C. is all substituted by 238° C. which is the risen temperature saturation value. Thereby, the relationship between the final accumulated electrical energy of the non-sheet-passing portion of the heating elements 42*a* and 42*b* and the risen temperature value of the non-sheet-passing portion of the fixing film 51 can be shown by the graph illustrated in FIG. 8.

Figure 8:
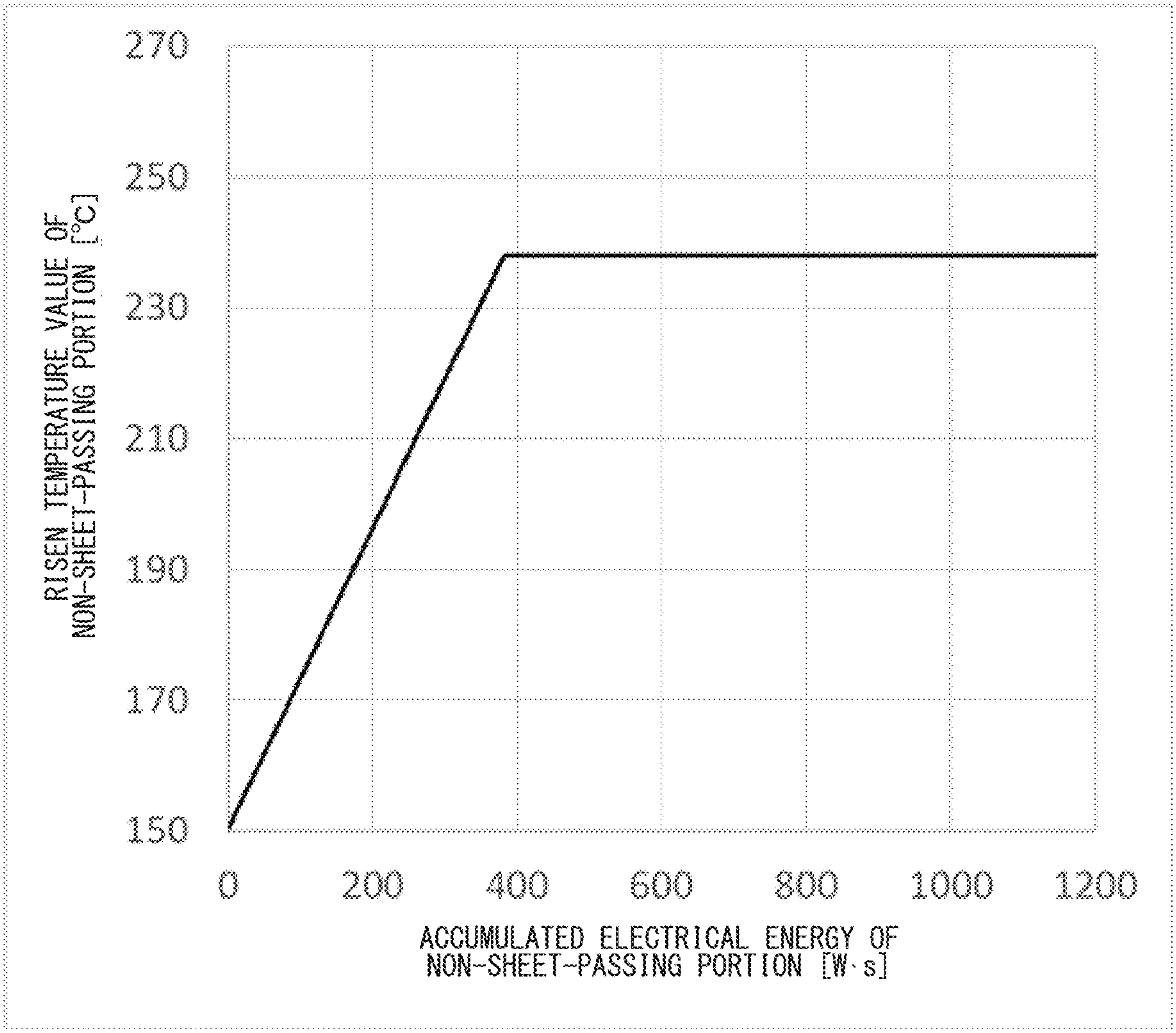
FIG. 8 is a graph illustrating a relational expression 3 according to the first embodiment.

FIG. 8 is a graph showing a relationship between the accumulated electrical energy supplied to the non-sheet-passing portion of the heating elements 42*a* and 42*b* and the risen temperature value of the non-sheet-passing portion of the fixing film 51. In FIG. 8, a vertical axis (Y axis) shows a risen temperature value (unit: ° C.) of the non-sheet-passing portion of the fixing film 51, and a horizontal axis (X axis) shows an accumulated electrical energy supplied to the non-sheet-passing portion of the heating elements 42*a* and 42*b*. When the accumulated electrical energy of the non-sheet-passing portion is represented by X and the risen temperature value of the non-sheet-passing portion is represented by Y, the relational expression 3 representing the graph illustrated in FIG. 8 calculates the value of Y using Y=0.23 X+150 according to the relational expression 1 in a case where the value of X is 0 to 383, and sets value Y to Y=238 in a case where the value of X exceeds 383. Based on the relational expression 3 and the accumulated electrical energy of the non-sheet-passing portion of the heating elements 42*a* and 42*b* after printing is ended, the risen temperature value of the non-sheet-passing portion of the fixing film 51 after the printing is ended can be calculated.

Cooling Time of Fixing Unit according to Risen Temperature Value of Non-Sheet-Passing Portion Next, a cooling time with respect to the risen temperature value of the non-sheet-passing portion of the fixing film 51 will be described. The cooling time is a time for lowering a temperature of a non-sheet-passing portion in a high temperature state of the fixing film 51 of the fixing unit 50 heated by passing a small-size sheet with a narrow sheet width to a predetermined temperature, that is, period of time of execution of the operation of heat leveling for leveling a heat distribution in the nip portion. Further, the predetermined temperature refers to a temperature in which hot offset does not occur even if the sheet width of the sheet P to be printed next is wider than the sheet width of the sheet P to which printing has been performed immediately before. By lowering the temperature of the non-sheet-passing portion of the fixing film 51 to a predetermined temperature for heat leveling, the occurrence of a hot offset can be suppressed even if a large-size paper having a wide width is passed through after the small-size sheet is passed through. In the present embodiment, the risen temperature value of the non-sheet-passing portion of the fixing film 51 after passing through the small-size sheet is calculated, and according to the calculated risen temperature value, the cooling time for lowering the temperature of the non-sheet-passing portion of the fixing film 51 is determined. The cooling time is determined to be longer if the risen temperature value of the non-sheet-passing portion of the fixing film 51 is high and shorter if low. During the cooling time, the pressure roller 53 of the fixing unit 50 can be rotated continuously or can be stopped without being rotated.

Control Sequence of Cooling of Fixing Unit

Figure 9:
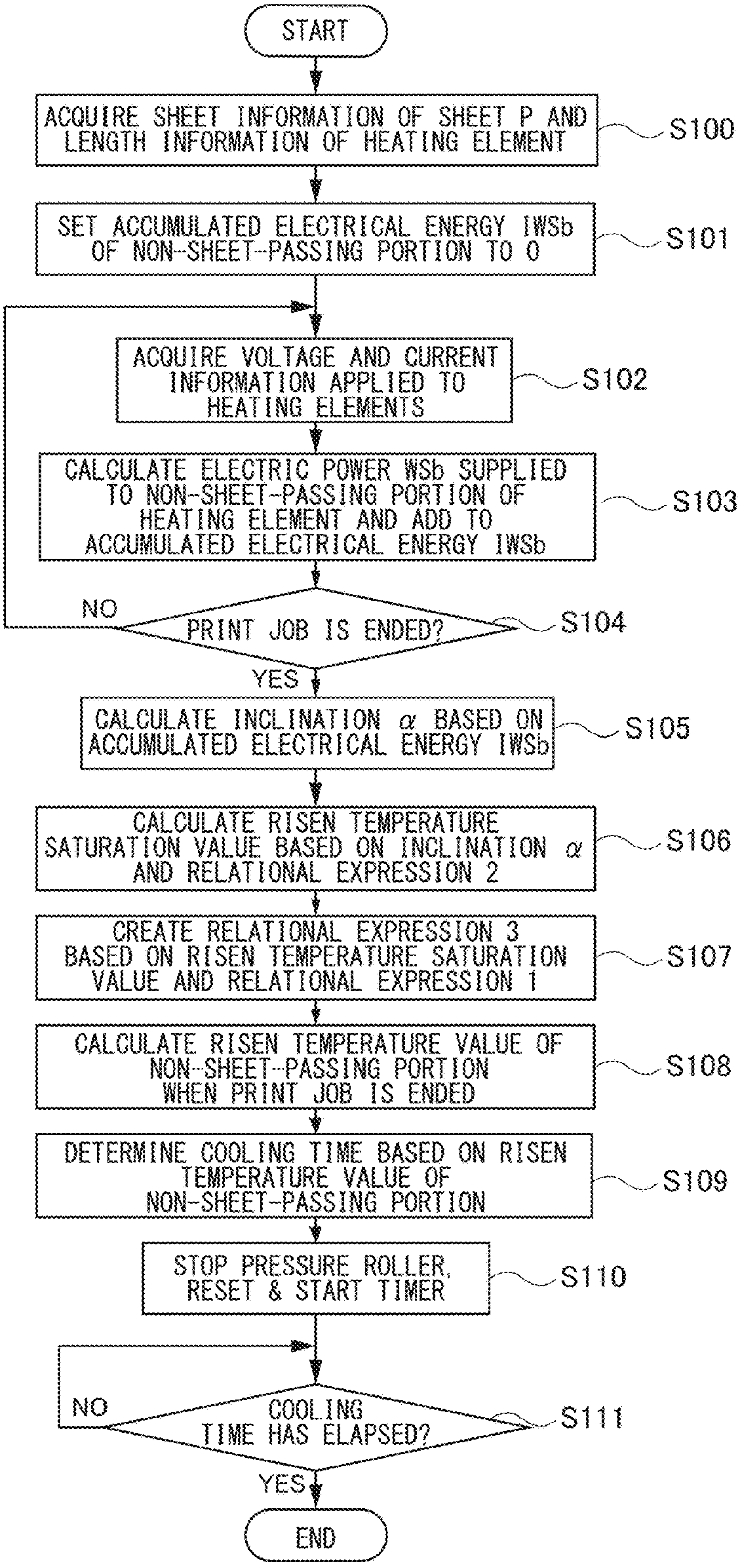
FIG. 9 is a flowchart illustrating a control sequence for cooling the fixing unit according to the first embodiment.

FIG. 9 is a flowchart showing a control sequence of cooling for lowering the risen temperature value of the non-sheet-passing portion of the fixing film 51 of the fixing unit 50 mentioned above. The processing illustrated in FIG. 9 is started when printing of the sheet P is performed, and it is executed by the CPU 94. The CPU 94 performs temperature control of the fixing film 51 of the fixing unit 50 by controlling power supply to the heating elements 42*a* and 42*b* of the heater 40, but it is assumed to be executed by a different processing as the processing illustrated in the flowchart of FIG. 9. Further, it is assumed that the length information in the longitudinal direction of the heating elements 42*a* and 42*b* and the above-mentioned relational expressions 1 and 2 are stored in advance in the memory 95. Further, it is assumed that a table associating the risen temperature value of the non-sheet-passing portion of the fixing film 51 and a cooling time for lowering the temperature of the non-sheet-passing portion of the fixing film 51 to the predetermined temperature is stored in the memory 95.

In the image forming apparatus, when a print command is received from the PC 110, the video controller 91 transmits a print command including the information of the sheet P to the CPU 94, and the CPU 94 having received the print command from the video controller 91 starts the printing operation of the sheet P. The print job based on the print command from the PC 110 is assumed to be the print job using the sheet P having the same sheet size.

In step (hereinafter abbreviated as S) 100, the CPU 94 acquires a sheet width ha based on information of the sheet P contained in the print command received from the video controller 91 and acquires a length information H in the longitudinal direction of the heating elements 42*a* and 42*b* from the memory 95. In S101, the CPU 94 sets the accumulated electrical energy IWSb in area B of the non-sheet-passing portion of the heating elements 42*a* and 42*b* to 0.

In S102, the CPU 94 acquires a voltage information applied to the heating elements 42*a* and 42*b* measured by the voltmeter 58 and a current information flowing to the heating elements 42*a* and 42*b* measured by the ammeter 59. In S103, the CPU 94 calculates the electric power WS(=voltage× current) being supplied to the heating elements 42*a* and 42*b* based on the voltage information and the current information acquired in S102. Then, the CPU 94 calculates the electric power WSb of the non-sheet-passing portion described earlier using the calculated electric power WS, the sheet width ha of the sheet P, and the longitudinal length of area B of the non-sheet-passing portion of the heating elements 42*a* and 42*b* (heating element length H−sheet width ha)/2. Further, the CPU 94 adds the calculated electric power WSb to the value of the accumulated electrical energy IWSb of area B of the non-sheet-passing portion of the heating elements 42*a* and 42*b*, updates the value of the accumulated electrical energy IWSb, and saves the updated accumulated electrical energy IWSb in the memory 95. In S104, the CPU 94 determines whether the print job has ended, wherein if it is determined that the print job has not ended, the procedure returns to S102, and if it is determined that the print job has ended, the procedure advances to S105.

In S105, the CPU 94 reads the accumulated electrical energy IWSb stored in the memory 95 each time update is performed and calculates the inclination α indicating the variation of the accumulated electrical energy IWSb accompanying time transition. In S106, the CPU 94 reads the relational expression 2 described earlier from the memory 95 and substitutes the inclination α calculated in S105 to the relational expression 2 being read, to thereby calculate the risen temperature saturation value of the non-sheet-passing portion of the fixing film 51 with respect to the sheet P.

In S107, the CPU 94 uses the risen temperature saturation value calculated in S106 and relational expression 1 (accumulated electrical energy of non-sheet-passing portion and temperature rise in non-sheet-passing portion) read from the memory 95 to generate the above-mentioned relational expression 3 in which all the temperature rise values in non-sheet-passing portion higher than the risen temperature saturation value are substituted by the risen temperature saturation value. In S108, the CPU 94 reads the accumulated electrical energy IWSb when the print job is ended stored in the memory 95, and the accumulated electrical energy IWSb being read is substituted in the relational expression 3 generated in S107, and the risen temperature value of the non-sheet-passing portion of the fixing film 51 when the print job is ended is calculated. In other words, the CPU 94 serves as a temperature calculation unit configured to calculate a temperature of the film in the second area (non-sheet-passing area).

In S109, the CPU 94 acquires the cooling time corresponding to the risen temperature value of the non-sheet-passing portion of the fixing film 51 calculated in S108 from the table associating the risen temperature value of the non-sheet-passing portion of the fixing film 51 with the cooling time of the fixing film 51 stored in the memory 95. In S110, the CPU 94 stops the pressure roller 53 of the fixing unit 50, and resets and starts a timer. In S111, the CPU 94 refers to the timer, and determines whether a timer value has passed the cooling time. If the CPU 94 determines that the timer value has not passed the cooling time, the procedure is returned to S111, and if it is determined that the timer value has passed the cooling time, the procedure is ended.

In this example, during the cooling time, the processing of stopping the rotation of the pressure roller 53 when lowering the temperature of the non-sheet-passing portion of the fixing film 51 was performed. Alternately, for example, the pressure roller 53 for lowering the temperature of the non-sheet-passing portion of the fixing film 51 can be rotated during the cooling time, and the processing of stopping the rotation of the pressure roller 53 can be performed after the cooling time had elapsed.

Further, according to the present embodiment, the print job of performing printing to sheets P of the same size was taken as an example. Alternately, in the case of a print job in which printing is performed to a plurality of sheets P having different sizes, it is possible to perform the cooling process of the pressure roller 53 when the sheet size is changed, and to perform the printing of the subsequent sheet P after the cooling process has been ended.

As described earlier, according to the present embodiment, the cooling time of the fixing unit after the small-size sheet had passed is shortened by accurately calculating the risen temperature value of the non-sheet-passing portion of the fixing member based on the accumulated electrical energy of the non-sheet-passing portion of the heating element and the risen temperature saturation value of the non-sheet-passing portion. By executing cooling of the fixing member appropriately according to the temperature of the fixing member, the occurrence of hot offsets can be reduced even if a large-size paper is passed through after a small-size paper had passed through.

As described above, according to the present embodiment, the period of rotation of the pressure roller for cooling the fixing member can be controlled according to the temperature of the non-sheet-passing portion of the fixing member of the fixing unit.

Second Embodiment

The first embodiment illustrated an example of a case where the electrical energy of the area of the non-sheet-passing portion of the heating element of the heater is calculated based on the voltage information measured by the voltmeter and the ammeter and the current information. The second embodiment illustrates a method of calculating an electrical energy of an area of a non-sheet-passing portion of a heating element of a heater in a fixing unit that is not equipped with a voltmeter and an ammeter.

Heater Configuration

Figure 10A:
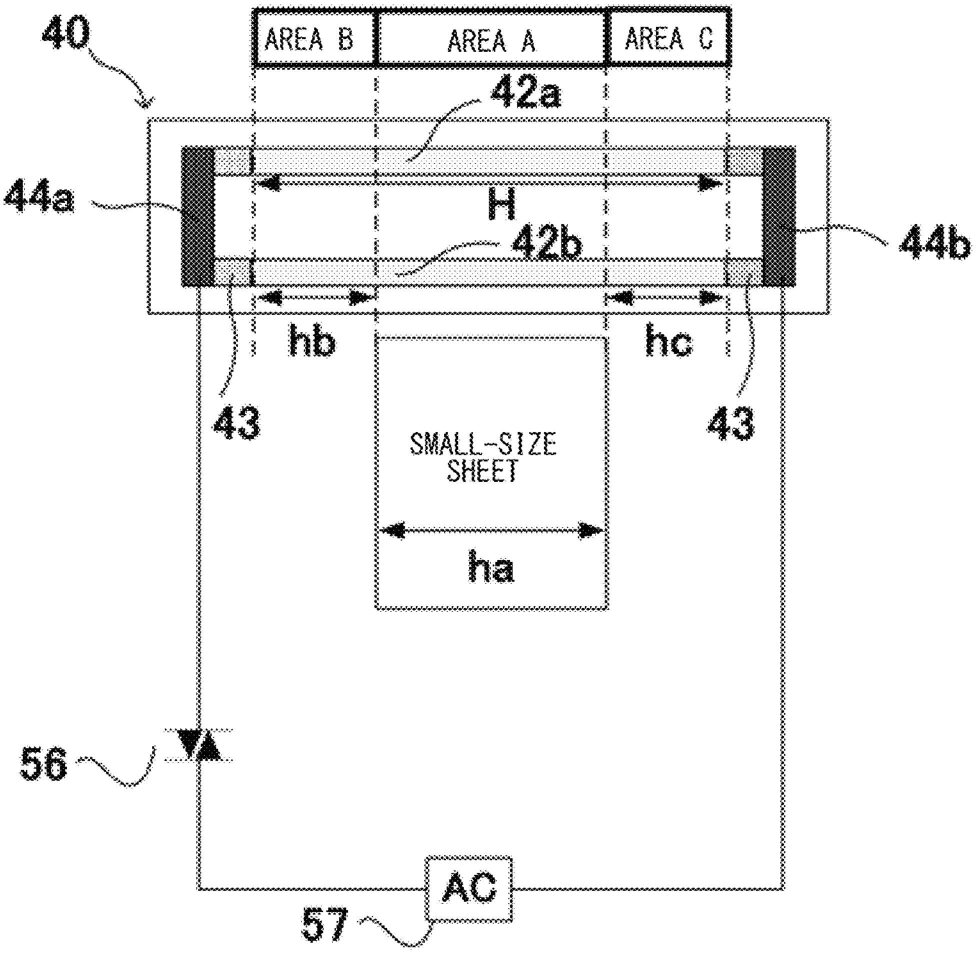
FIG. 10A is an explanatory view illustrating a power supply path according to a second embodiment.

FIG. 10A is a schematic diagram illustrating a power supply path for supplying power to the heater 40 according to the present embodiment. FIG. 10A differs from FIG. 5 illustrating the first embodiment in that the voltmeter 58 and the ammeter 59 are not provided. The other configurations of the image forming apparatus are similar to the first embodiment, so that by assigning the same reference numbers as the first embodiment to the same members, the description thereof is omitted.

In the present embodiment, the memory 95 stores an application voltage table associating a temperature difference between a target temperature of the heater 40 and a temperature of the heater 40 detected by the thermistor 60 with a voltage to be applied to the heater 40. Further, the memory 95 also stores a control signal table associating the voltage to be applied to the heater 40 with a timing and output interval of outputting a control signal for turning on the triac 56. The CPU 94 periodically detects a temperature difference from the target temperature of the heater 40 based on the temperature detection result of the heater 40 by the thermistor 60, and acquires an application voltage according to the detected temperature difference from the application voltage table. Further, the CPU 94 determines an output timing of a control signal of the triac 56 according to the acquired application voltage based on the control signal table, and outputs the control signal to the triac 56 according to the output timing. According to the present embodiment, the CPU 94 outputs the control signal according to a half-wave cycle, i.e., every half cycle, of an AC voltage waveform of the AC power supply 57. When a control signal is output from the CPU 94, the triac 56 is set to an on state during the half cycle of the AC voltage waveform, and the AC voltage from the AC power supply 57 is supplied to the heater 40.

Relationship between AC voltage and Control Signal for Triac

Figure 10B:
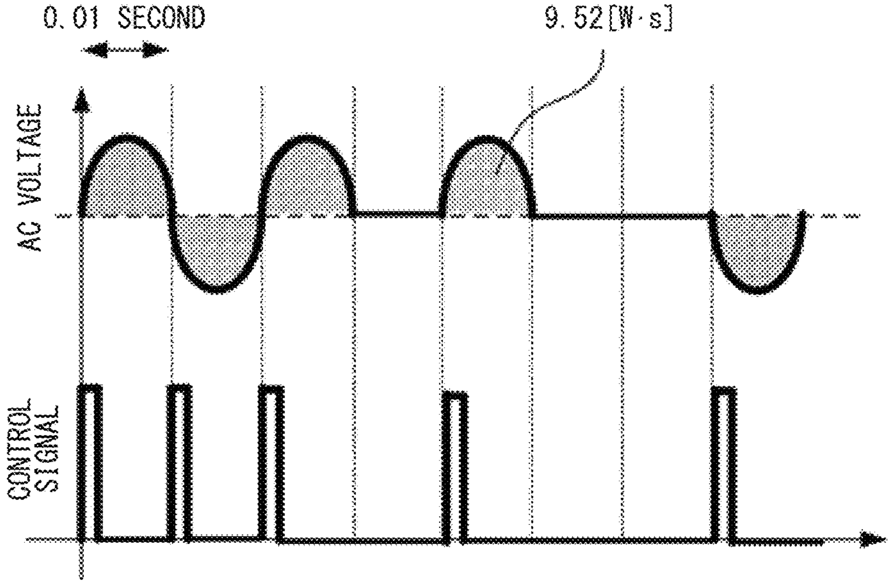
FIG. 10B is an explanatory view illustrating a relationship between a power supply quantity and a control signal according to the second embodiment.

FIG. 10B is an explanatory view illustrating a relationship between an AC voltage of the AC power supply 57 and a control signal for driving the triac 56. In FIG. 10B, the lower drawing illustrates a control signal of the triac 56 output from the CPU 94, and the triac 56 is turned on for half a cycle of the AC voltage output from the control signal. The upper drawing illustrates a waveform of AC voltage (denoted as AC voltage in the drawing) supplied from the AC power supply 57 to the heater 40, and AC voltage is supplied to the heater 40 for half a cycle only when the control signal is output. The hatching in the drawing indicates a state in which AC voltage is supplied to the heater 40. The AC power supply 57 has a voltage of 100 V, and a power supply frequency of 50 Hz, and a combined resistance of the heating elements 42*a* and 42*b* of the heater 40 is 10.5Ω. Then, a maximum electric power WS per second supplied to the heater 40 is $WS=V^2/R=100\ (V)\times 100\ (V)/10.5\ (\Omega)\approx 952$ [W]. The power supply frequency 50 Hz has 50 cycles (=100 half waves) per second, and one half-wave corresponds to 1 (s)/100 (times)=0.01 s. Therefore, the electrical energy supplied to the heater 40 per one half-wave will be $(100)\ (V)\times 100\ (V)/10.5(\Omega))\times 0.01\ (s)=9.52$ [W·s]

In the present embodiment, the CPU 94 adds the electrical energy 9.52 [W·s] to the accumulated electrical energy IWS each time a control signal is output to the triac 56. The accumulated electrical energy IWSb at area B of the non-sheet-passing portion of the heater 40 can be calculated by the calculation formula of accumulated electrical energy IWSb=hb/H×IWS described in the first embodiment. After the calculation of the accumulated electrical energy of the non-sheet-passing portion of the heater 40, the method for calculating the risen temperature saturation value of the non-sheet-passing portion, the relational expression 3, and the risen temperature value of the non-sheet-passing portion are the same as the first embodiment, so that descriptions thereof will be omitted.

In the present embodiment, the electrical energy was calculated assuming that the synthetic resistance value of the heating elements 42*a* and 42*b* is 10.5Ω and the AC voltage value of the AC power supply 57 is 100 V. The dispersion of the resistance value of the heating elements 42*a* and 42*b* is as small as ±7%, so that it has little impact on the measurement accuracy of the electrical energy. Meanwhile, the dispersion of power supply voltage of the AC power supply 57 varies according to operating environment, so that it may have some impact on the measurement accuracy of the electrical energy. Since it is not desirable that the accumulated electrical energy at the non-sheet-passing portion of the heater 40 is calculated too low, it is desirable that the power supply voltage of the AC power supply 57 is set to the maximum assumable voltage value. The information on the resistance value of the heating elements 42*a* and 42*b* and the power supply voltage of the AC power supply 57 can be stored in advance in the memory 95, and the CPU 94 can refer to the information when necessary.

Further, the flowchart illustrated in FIG. 9 of the first embodiment is also applicable to the second embodiment. According to FIG. 9, in the processing of S102, the CPU 94 acquired the voltage information and the current information measured by the voltmeter 58 and the ammeter 59, and in the processing of S103, the acquired voltage information and current information were used to calculate the electric power and update the accumulated electrical energy. In the second embodiment, unlike the first embodiment, the voltmeter 58 and the ammeter 59 are not provided.

Therefore, in order to apply the flowchart of FIG. 9 to the second embodiment, the processing of S102 and S103 can be changed in the following manner. In the processing of S102, the CPU 94 determines whether to output a control signal to the triac 56, wherein if the control signal is to be output, the procedure advances to step S103, and if the control signal is not to be output, the procedure advances to S104. Further, in the processing of S103, the CPU 94 adds the electrical energy 9.52 [W·s] to be supplied to area B of the non-sheet-passing portion of the heater 40 during a half-wave cycle of AC voltage to the accumulated electrical energy IWSb and stores the updated accumulated electrical energy IWSb in the memory 95.

Alternately, in the processing of S103, it is possible to count the number of times the control signal has been output to the triac 56, and when it is determined in S104 that the print job has ended, the accumulated electrical energy can be calculated by multiplying the electrical energy 9.52 [W·s] by the count value.

As described above, according to the present embodiment, the accumulated electrical energy of the non-sheet-passing portion is calculated by accumulating the electrical energy supplied to the heater 40 per half-wave cycle of the power supply frequency from the AC power supply 57 every time a control signal to the triac 56 is output. Similarly to the first embodiment, the cooling time of the fixing unit after a small-size sheet has been passed through by calculating the risen temperature value of the non-sheet-passing portion of the fixing member with high accuracy based on the accumulated electrical energy of the non-sheet-passing portion of the heating element and the risen temperature saturation value of the non-sheet-passing portion. By executing cooling of the fixing member appropriately according to the temperature of the fixing member, the occurrence of hot offset can be reduced even if a large-size sheet is passed through after the passing of a small-size sheet.

As described above, according to the present embodiment, the period of rotation of the pressure roller for cooling the fixing member can be controlled according to the temperature of the non-sheet-passing portion of the fixing member of the fixing unit.

Third Embodiment

According to the heater of the first and second embodiments, only one kind of heating element was provided. The heater according to the third embodiment includes a plurality of heating elements, so the method for controlling the electrical energy supplied to the non-sheet-passing portion of the heating elements by changing the usage proportions of the heating elements will be described.

Heater Configuration

Figure 11A:
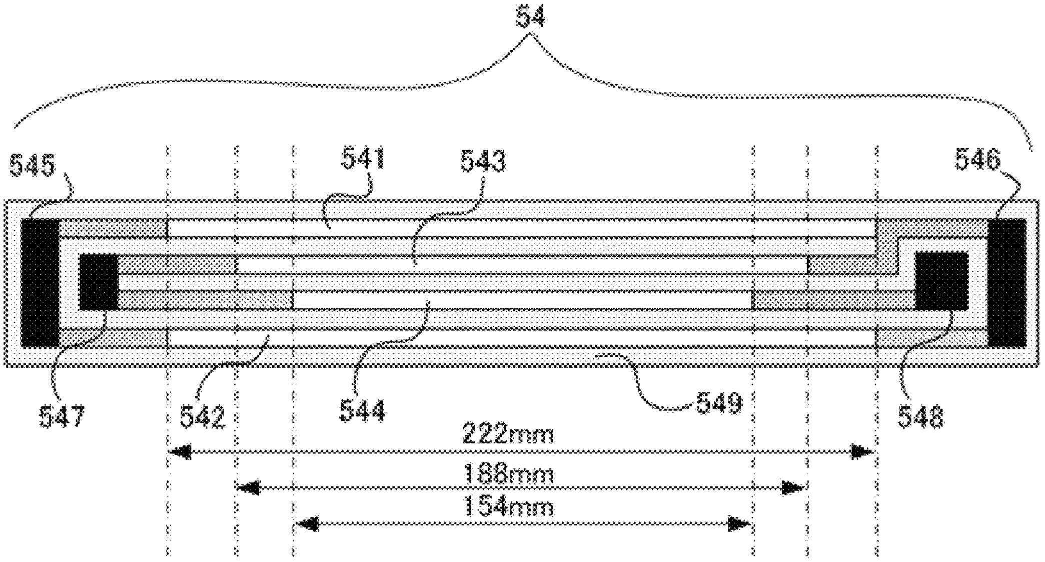
FIG. 11A is a view illustrating a heater configuration according to a third embodiment.

FIG. 11A illustrates a configuration of a heater 54 according to a present embodiment. The heater 54 is formed by providing, on a heater substrate 549 of $Al_2O_3$ material (thickness t=1 mm, width w=6.3 mm, and length 1=280 mm), heating elements formed of a conductive material mainly composed of silver and palladium, conduction paths mainly composed of silver, and contacts for power supply. The width w denotes a length in the short-length direction of the drawing, and length 1 denotes a length in the longitudinal direction of the drawing. The heater 54 includes heating elements 541 and 542 having the longest length in the longitudinal direction, a heating element 543 having the second longest length in the longitudinal direction, and a heating element 544 having the shortest length in the longitudinal direction. The dimensions of the heating elements 541 and 542 are thickness t=10 μm, width w=0.7 mm, and length 1=222 mm, corresponding to a sheet width 210 mm of an A4-size sheet. Further, the dimension of the heating element 543 is t=10 μm, width w=0.7 mm, and length 1=188 mm, corresponding to a sheet width 182 mm of a B5-size sheet. The dimensions of the heating element 544 are thickness t=10 μm, width w=0.7 mm, and length 1=154 mm, corresponding to a sheet width 148.5 mm of an A5-size sheet.

A first end of each of the heating elements 541 and 542, i.e., first heating element, is electrically connected to a contact 545 for power supply, and a second end of each of the heating elements is electrically connected to a contact 546 for power supply. Further, a first end of the heating element 543, i.e., second heating element, is connected to a contact 547 for power supply, and a second end is electrically connected to the contact 546 for power supply. Then, a first end of the heating element 544, i.e., second heating element, is connected to the contact 547 for power supply, and a second end is electrically connected to a contact 548 for power supply.

The electric resistance of each of the heating elements 541 and 542 is 21Ω, and the synthetic resistance value of the heating elements 541 and 542 between the contacts 545 and 546 for power supply is 10.5Ω. Further, the resistance value of the heating element 543 is 24Ω, and the resistance value of the heating element 544 is 28Ω. The intervals in the short-length direction in the drawing between each of the heating elements 541, 542, 543, and 544 is 0.7 mm.

Arrangement of Heating Element

Next, the arrangement of each of the heating elements 541, 542, 543, and 544 on the heater substrate 549 will be described. The heating elements 541 and 542 serving as a first heating element is a heating element that receives the maximum power supply quantity from the AC power supply 57, and they can heat the fixing unit 50 to a sheet-passing state in a short time. The heating elements 541 and 542 can be heated in a short time, but a heating unevenness of the heater substrate 549 when maximum voltage is applied thereto is great, so that deformation of the heater substrate 549 may occur. Therefore, according to the present embodiment, two heating elements 541 and 542 are arranged in parallel so as not to have power concentrate to one area. Further, the heating elements 541 and 542 are arranged symmetrically with respect to a center of the heater substrate 549 in the short-length direction, so that the heating unevenness of the heater substrate 549 is reduced.

Meanwhile, there is only one heating element 543 serving as a second heating element and there is only one heating element 544 serving as a third heating element so that the increase in size of the heater 54 can be suppressed. The heating elements 543 and 544 have a short longitudinal length compared to the heating elements 541 and 542, so that they are not suitable from the viewpoint of leveling heating of the heater substrate 549, so that by setting the power supply quantity thereto from the AC power supply 57 to a small value, the heating unevenness of the heater substrate 549 is reduced.

Control of Power Supply Path

Figure 11B:
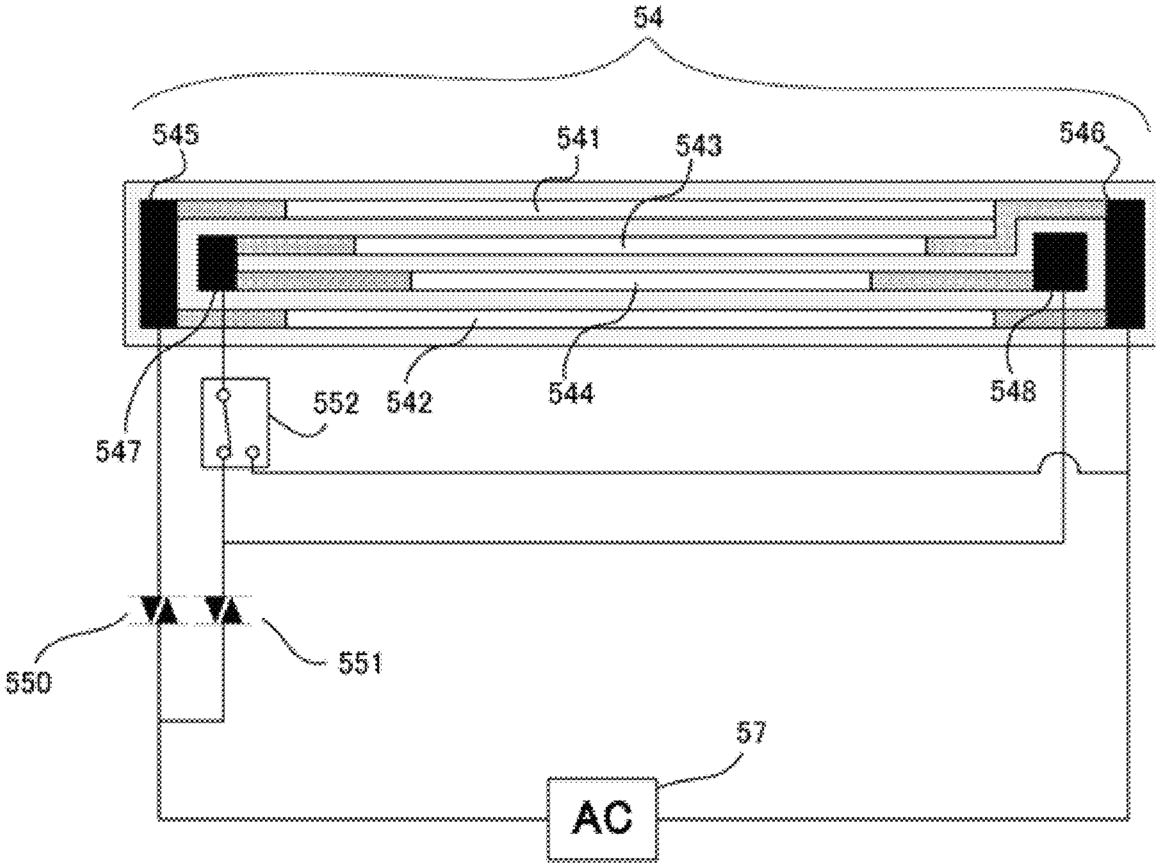
FIG. 11B is a view illustrating a power supply path of the heater according to the third embodiment.

Next, control of power supply path for supplying power to each of the heating element will be explained. FIG. 11B is a schematic diagram illustrating a power supply path for supplying power from the AC power supply 57 to the heater 54. In FIG. 11B, a first end of the AC power supply 57 is connected to a first end of triacs 550 and 551, and a second end thereof is connected to the contact 546 for power supply of the heater 54 and a changeover contact relay (hereinafter referred to as a relay 552) serving as the heating element switching apparatus 552. A second end of the triac 550 is connected to the contact 545 for power supply of the heater 54. Meanwhile, a second end of the triac 551 is connected to the relay 552 and the contact 548 for power supply of the heater 54. The relay 552 serving as a switch includes three contacts, which are a contact connected to the second end of the triac 551, a contact connected to the second end of the AC power supply 57, and a contact connected to the contact 547 for power supply of the heater 54. The contact connected to the contact 547 of the relay 552 can be connected to the contact connected to the second end of the triac 551 or the contact connected to the second end of the AC power supply 57 by a relay control signal output from the CPU 94.

As illustrated in FIG. 11B, a configuration of the power supply path according to the present embodiment differs from the configuration of the power supply path of the first embodiment illustrated in FIG. 4B in that the number of triacs is changed from one to two, that the relay 552 is added, and that the voltmeter 58 and the ammeter 59 are eliminated. The other configurations of the image forming apparatus are similar to the first embodiment, so that by assigning the same reference numbers to the same members, the descriptions thereof are omitted.

When supplying power from the AC power supply 57 to the heating elements 541 and 542, the CPU 94 outputs a control signal to the triac 550 to turn the triac 550 on and applies the AC voltage between the contact 545 and the contact 546 of the heater 54. When supplying power from the AC power supply 57 to the heating element 543, the CPU 94 outputs a control signal to the triac 551 to turn the triac 551 on and applies the AC voltage between the contact 547 and the contact 546 of the heater 54. In this state, the CPU 94 will not output a relay control signal to the relay 552, so that the contact connected to the contact 547 of the heater 54 and the contact connected to the triac 551 are connected by the relay 552. When supplying power from the AC power supply 57 to the heating element 544, the CPU 94 outputs a relay control signal, and the relay 552 connects the contact connected to the contact 547 of the heater 54 and the contact connected to the AC power supply 57. Then, after switching the connection of the relay 552, the CPU 94 outputs a control signal to the triac 551 to turn on the triac 551 and applies the AC voltage between the contact 547 and the contact 548 of the heater 54.

As mentioned above, the synthetic resistance value of the heating elements 541 and 542 is 10.5Ω, and the resistance values of the heating elements 543 and 544 are 24Ω and 28Ω, respectively. For example, if a maximum voltage capable of being supplied from the AC power supply 57 is 120 V, the maximum current value at the heating elements 541 and 542 will be 11.43 A, the maximum current value at the heating element 543 will be 5 A, and the maximum current value at the heating element 544 will be 4.29 A. The current value suppliable through an AC voltage line for home is generally 15 A or lower, and if AC voltage is applied simultaneously to a plurality of heating elements, such as the heating elements 541 and 542 and the heating element 543, the current value may exceed 15 A. Therefore, according to the present embodiment, control is performed so that if AC voltage is to be applied, or power is to be supplied, to one of the heating elements, AC voltage from the AC power supply 57 will not be applied to the other two heating elements. That is, while outputting a control signal to the triac 550 illustrated in FIG. 11B, the CPU 94 will not output a control signal to the triac 551. Since the triacs 550 and 551 will not be turned on simultaneously, the AC voltage from the AC power supply 57 will not be applied to a plurality of heating elements.

Control of Power Supply to Heater

Next, a control of power supply to the heater 54 will be explained. For example, when a B5-size sheet is passed through, the heating elements 541 and 542, and the heating element 543 having a longitudinal length approximate the B5-size sheet width, are used as the heating elements to which power from the AC power supply 57 is supplied. Further, when a A5-size sheet is passed through, the heating elements 541 and 542, and the heating element 544 having a longitudinal length approximate the A5-size sheet width, are used as the heating elements to which power from the AC power supply 57 is supplied.

The CPU 94 detects the temperature difference from the target temperature of the heater 54 based on the temperature detection result of the heater 54 by the thermistor 60, and acquires the application voltage according to the temperature difference being ed based on the application voltage table explained in the second embodiment. Further, the CPU 94 determines the output timing of the control signal of the triacs 550 and 551 according to the acquired application voltage based on the control signal table explained in the second embodiment, and outputs a control signal to either one of the triacs 550 and 551 according to the output timing. The CPU 94 determines which heating element should receive power supply by referring to usage proportions of the heating elements determined in advance. Control of power supply is performed based on a usage time ratio, so that for example, if the usage proportion of the heating elements 541 and 542 is 30% and the usage proportion of the heating element 543 is 70%, power supply to the heating elements 541 and 542 is performed for 0.3 s, and power supply to the heating element 543 is performed for 0.7 s.

There are two states of the fixing unit 50 when a sheet is passed through, which are a cooled state in which the heater 54 is not heated, and a warmed state in which the heater 54 is heated. In a state where the fixing unit 50 is cooled, there is a member that needs to be heated by applying power supply other than the part through which the sheet is passed, so that a greater electric power needs to be applied to the heater 54 to warm, or heat, the entire heater 54 using the heating elements 541 and 542. Meanwhile, in a state where the fixing unit 50 is warmed, there is no need to apply such a high electric power compared to the cooled state, but the power supply quantity to the heating elements 543 and 544 is small, as mentioned earlier. Therefore, the usage proportion of the heating elements 541 and 542 needs to be varied between the cooled state and the warmed state of the fixing unit 50. That is, the CPU 94 increases the usage proportion of the heating elements 541 and 542 having a greater power supply quantity in a state where the fixing unit 50 is cooled and increases the usage proportions of the heating elements 543 and 544 in a state where the fixing unit 50 is warmed so as to cut down the power supply quantity to the non-sheet-passing portion of the heater 54.

Determination of whether the fixing unit 50 is in a cooled state or a warmed state is performed based on the detection temperature of the thermistor 60 arranged in contact with the heater substrate 549. The fixing unit 50 is in a warmed state if the detection temperature of the thermistor 60 is high. According to the present embodiment, the detection temperature of the thermistor 60 is divided into four temperature sections, and the sections are defined as warm-up levels 1, 2, 3, and 4, wherein the higher warm-up level indicates that the fixing unit 50 is warmed to a higher temperature.

Table 1 is a table indicating the temperature definition of the warm-up level of the fixing unit 50 and usage proportions of the heating elements 541, 542, 543, and 544 according to each warm-up level. In Table 1, a fixing unit warm-up level indicates warm-up levels 1 to 4, and a thermistor detection temperature shows the range of detection temperature of the thermistor 60 corresponding to each warm-up level. For example, if the temperature of the heater 54 detected by the thermistor 60 is lower than 50° C., the warm-up level of the fixing unit 50 is defined as level 1. Similarly, if the detection temperature of the heater 54 detected by the thermistor 60 is 80° C., 120° C., or 155° C., for example, the warm-up level is set to level 2, level 3, or level 4, respectively. Further, the usage proportion (unit: %) of the heating element indicates a usage proportion (percentage) of the heating element corresponding to the warm-up level. The usage proportions of heating elements indicated on the left side shows the usage proportions of the heating elements 541 and 542 and the heating element 543 used according to the warm-up level of the fixing unit 50 when a B5-size sheet is passed through. Meanwhile, the usage proportions of heating elements indicated on the right sideshows the usage proportions of the heating elements 541 and 542 and the heating element 544 used according to the warm-up level of the fixing unit 50 when a B5-size sheet is passed through. As shown in Table 1, the usage proportions of the heating elements 541 and 542 is set to be higher if the warm-up level is lower and the fixing unit 50 is not warmed.

TABLE 1

| FIXING UNIT WARM-UP LEVEL | THERMISTOR DETECTION TEMPERATURE | USAGE PROPORTION OF HEATING ELEMENT [%]: HEATING ELEMENTS 541, 542 | USAGE PROPORTION OF HEATING ELEMENT [%]: HEATING ELEMENT 543 | USAGE PROPORTION OF HEATING ELEMENT [%]: HEATING ELEMENTS 541, 542 | USAGE PROPORTION OF HEATING ELEMENT [%]: HEATING ELEMENT 544 |
|---|---|---|---|---|---|
| 1 | LOWER THAN 50° C. | 50 | 50 | 50 | 50 |
| 2 | 50° C. OR HIGHER AND LOWER THAN 100° C. | 30 | 70 | 30 | 70 |
| 3 | 100° C. OR HIGHER AND LOWER THAN 150° C. | 20 | 80 | 20 | 80 |
| 4 | 150° C. OR HIGHER | 10 | 90 | 10 | 90 |

Calculation of Power Supply Quantity to Heater

Figure 12A:
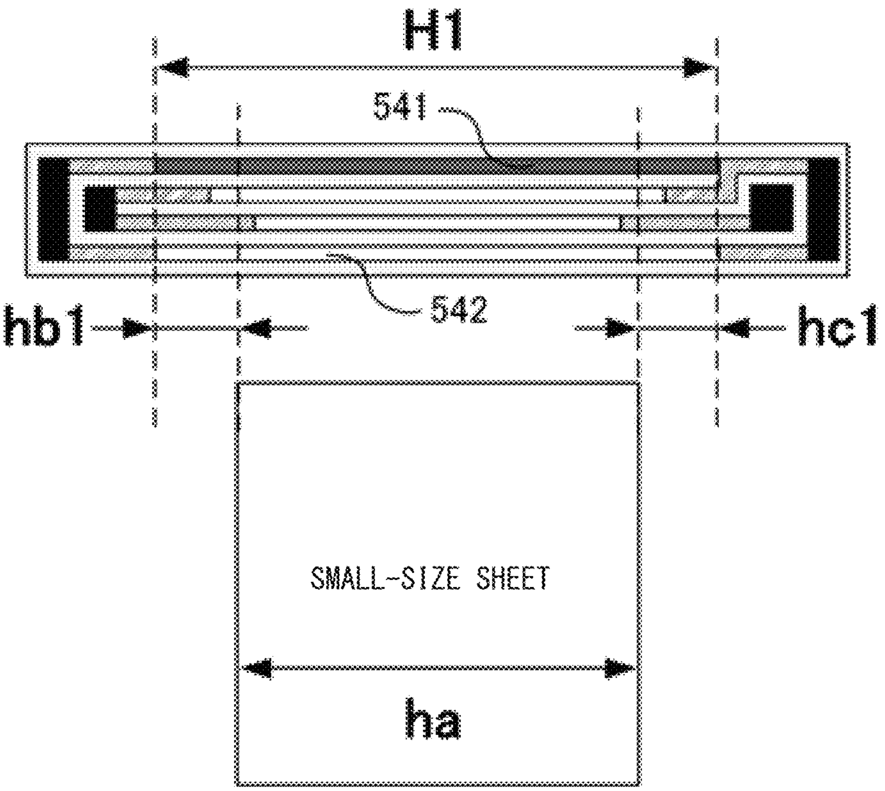
FIGS. 12A and 12B are each an explanatory view illustrating a positional relationship between a heating element and a sheet according to the third embodiment.
Figure 12B:
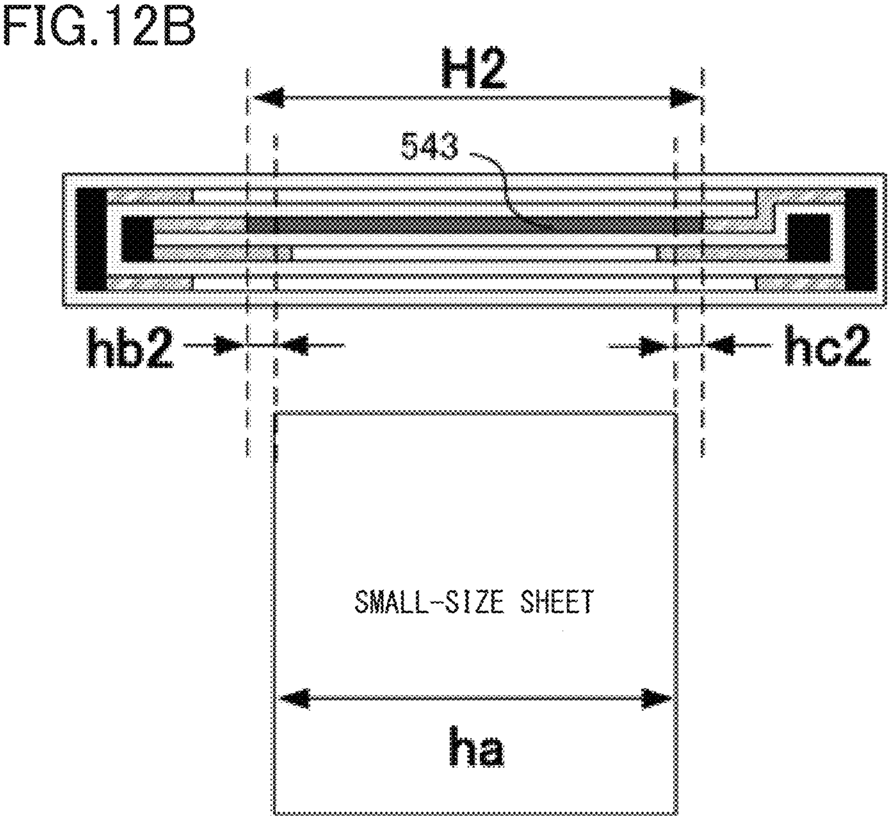

As shown in Table 1, when a B5-size sheet is passed through, the heating elements 541 and 542 and the heating element 543 are used. FIG. 12 is a view illustrating the relationship between a B5-size sheet and the size of the heating elements 541 and 542 and the heating element 543. FIG. 12A illustrates a positional relationship between the heating elements 541 and 542 and the B5-size sheet, and FIG. 12B illustrates a positional relationship between the heating element 543 and the B5-size sheet. In FIG. 12A, the sheet width ha of the B5-size sheet serving as a small-size sheet is 182 mm. The lengths of the heating elements 541 and 542 in the longitudinal direction of the drawing are the same, and length H1 is 222 mm. Further, lengths hb1 and hc1 of the non-sheet-passing area of the heating elements 541 and 542 through which the B5-size sheet does not pass are each 20 mm (=(222 [mm]−182 [mm])/2). In FIG. 12B, a length H2 in the longitudinal direction of the heating element 543 is 188 mm, and lengths hb2 and hc2 of the non-sheet-passing area of the heating element 543 where the B5-size sheet does not pass through are each 3 mm (=(188 [mm]−182 [mm])/2).

Similarly to the second embodiment, regarding the power supply quantity of the heater 54 to the heating element, the CPU 94 accumulates the electrical energy based on the number of control signals output to the triacs 550 and 551. For example, it is assumed that the synthetic resistance value of the heating elements 541 and 542 is 10.5Ω, the AC voltage of the AC power supply 57 is 100 V, and the power supply frequency is 50 Hz. Then, the electrical energy per one half-wave of the power supply frequency (0.01 s) will be (100 [V]×100 [V]/10.5 [Ω])×0.01 [s]=9.52 [W·s]. Meanwhile, if it is assumed that the resistance value of the heating element 543 is 24Ω, the AC voltage of the AC power supply 57 is 100 V, and the power supply frequency is 50 Hz, the electrical energy per one half-wave of the power supply frequency will be (100[V]×100 [V]/24 [Ω])×0.01 [s]=4.16 [W·s].

Figure 13:
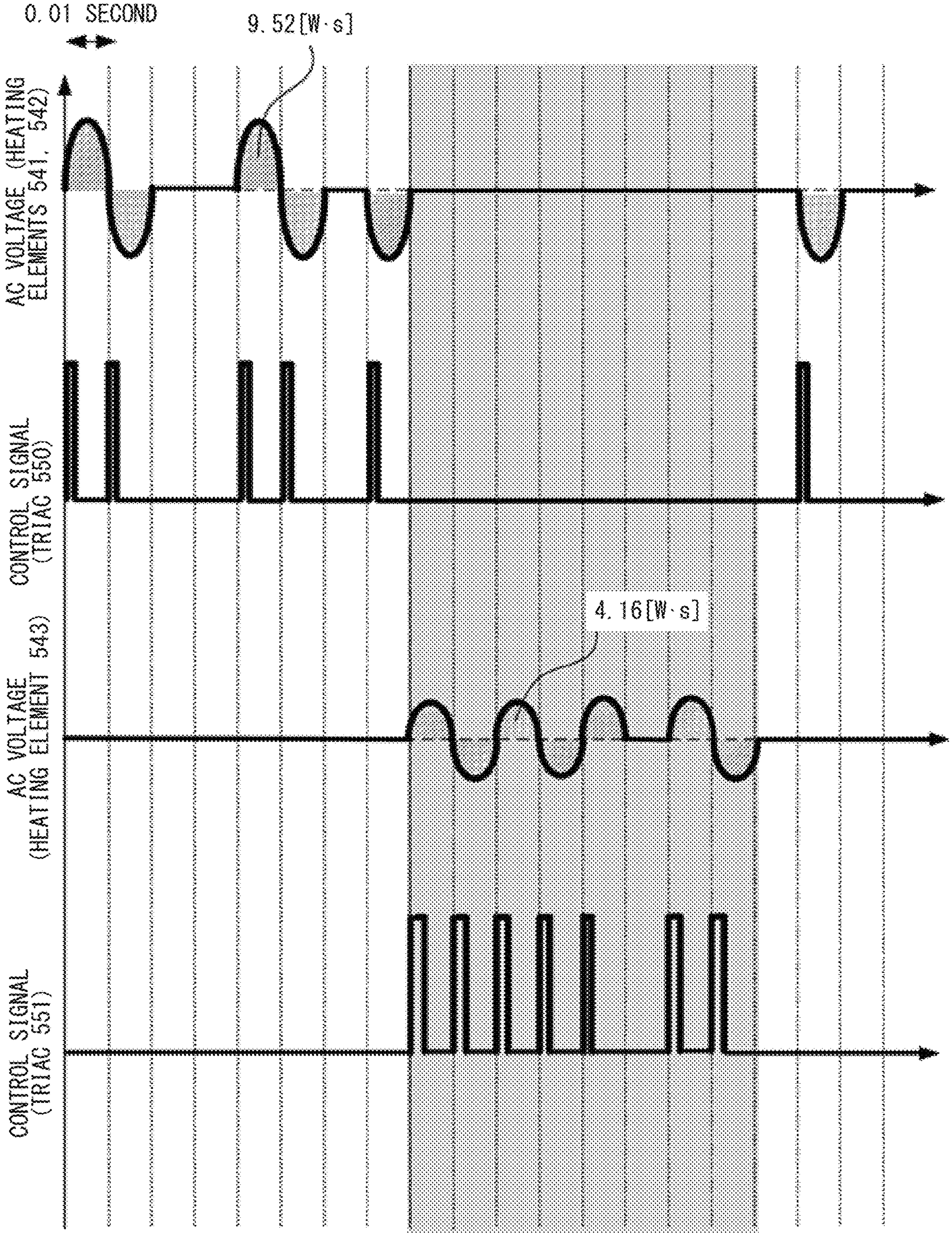
FIG. 13 is an explanatory view illustrating a relationship between a power supply quantity and a control signal according to the third embodiment.

FIG. 13 is a view illustrating a relationship between AC voltage waveforms applied to each of the heating elements and the control signals for turning on the triacs 550 and 551 in a state where the usage proportions of the heating elements 541 and 542 and the heating element 543 is 50%:50%. In FIG. 13, eight half-waves of the AC voltage waveform are set as a control unit. In FIG. 13, power supply is performed to the heating elements 541 and 542 for 0.08 s (=0.01 [s/half-wave]×8 [half-waves]) which is the time corresponding to eight half-waves, and thereafter, the power supply destination is switched to the heating element 543. Thereafter, power supply is performed to the heating element 543 for 0.08 s, which corresponds to the time corresponding to eight half-waves, before the power supply destination is switched back to the heating elements 541 and 542.

In order to apply AC voltage to the heating elements 541 and 542, the CPU 94 counts a number of times T1 the control signal has been output to the triac 550, and every time the control signal is output, an electrical energy of 9.52 [W·s] is added to the accumulated electrical energy IWS1 of the heating elements 541 and 542. An accumulated electrical energy IWSb1 at the area of the non-sheet-passing portion when the heating elements 541 and 542 are used can be calculated by the expression IWSb1=accumulated electrical energy IWS1×(length hb1 of non-sheet-passing portion of the heating elements 541 and 542/heating element length H1 of the heating elements 541 and 542). Similarly, in order to apply AC voltage to the heating element 543, the CPU 94 counts a number of times T2 the control signal has been output to the triac 551, and every time the control signal is output, electrical energy of 4.16 [W·s] is added to the accumulated electrical energy IWS2 of the heating element 543. An accumulated electrical energy IWSb2 at the area of the non-sheet-passing portion when the heating element 543 is used can be calculated by the expression IWSb2=accumulated electrical energy IWS2×(length hb2 of non-sheet-passing portion of the heating element 543/heating element length H2 of the heating element 543). Then, the CPU 94 calculates the accumulated electrical energy IWSb of the non-sheet-passing portion of the heater 54 by adding the accumulated electrical energy IWSb1 of the non-sheet-passing portion of the heating elements 541 and 542 being calculated and the accumulated electrical energy IWSb2 of the non-sheet-passing portion of the heating element 543.

Figure 14A:
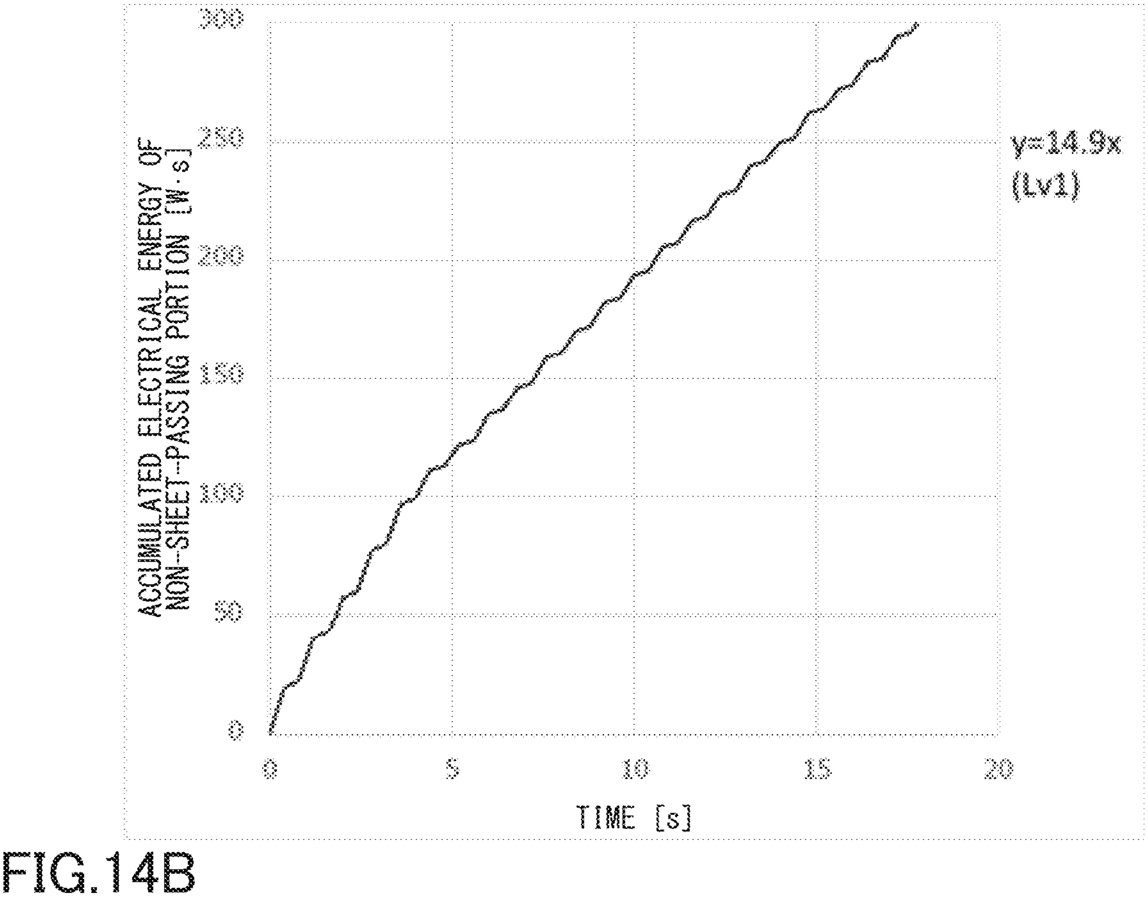
FIG. 14A is a view illustrating a relationship between an accumulated electrical energy and a temperature rising time of a non-sheet-passing portion according to the third embodiment.

Relationship between Accumulated Electrical Energy at Non-Sheet-Passing Portion of Heater and Risen Temperature Value of Non-Sheet-Passing Portion of Fixing Film FIG. 14A is a graph showing a time transition of the accumulated electrical energy IWSb in the area of the non-sheet-passing portion of the heater 54 in a state where the warm-up level of the fixing unit 50 is 1 (Lv1), that is, in a state where the ratio of the usage proportions of the heating elements 541 and 542 to the usage proportion of the heating element 543 is 50%:50%. In FIG. 14A, the vertical axis indicates the accumulated electrical energy IWSb (unit: W·s) in the area of the non-sheet-passing portion of the heater 54, and the horizontal axis indicates time (unit: s). Since the lengths of the heating elements differ, the electrical energies at the area of the non-sheet-passing portion of the heater 40 during use of the heating elements 541 and 542 and that during use of the heating element 543 differ. Further, as described above, since the heating elements 541 and 542 and the heating element 543 are used alternately, as illustrated in FIG. 14A, the accumulated electrical energy IWSb at the area of the non-sheet-passing portion is transited in steps. As described in the first and second embodiments, the CPU 94 calculates an inclination a based on the time transition of accumulated electrical energy, wherein the inclination $\alpha$ of the graph shown in FIG. 14A was 14.9. When the risen temperature saturation value in a state where the inclination $\alpha$ is 14.9 is calculated as Y=7.4X+156, which is the relational expression 2 of FIG. 7B explained in the first embodiment, the risen temperature saturation value is calculated as 266° C. (≈7.4 [° C.]×14.9+156 [° C.]).

Figure 14B:
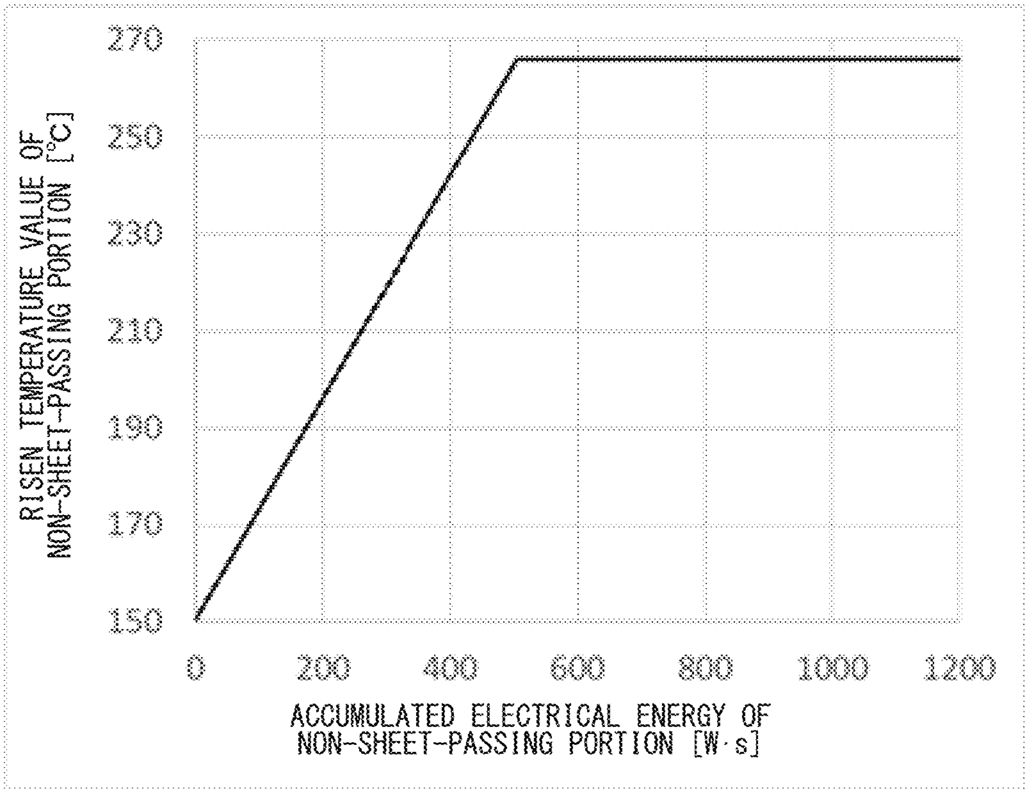
FIG. 14B is a view illustrating a relational expression 3 according to the third embodiment.

Next, if the risen temperature value at the area of the non-sheet-passing portion is higher than the risen temperature saturation value according to the relational expression 1 (Y=0.23X+150) according to FIG. 7A of the first embodiment, the risen temperature saturation value calculated by the relational expression 2 is substituted in the risen temperature value at the area of the non-sheet-passing portion of the relational expression 1. FIG. 14B is a graph illustrating a relational expression 3 which shows the relationship between the accumulated electrical energy (unit: W·s) of the non-sheet-passing portion of the heater 54 and the risen temperature value (unit: ° C.) of the non-sheet-passing portion of the fixing film 51 after substituting the risen temperature saturation value. The CPU 94 calculates the risen temperature value of the non-sheet-passing portion of the fixing film 51 after printing is ended based on the relational expression 3 and the accumulated electrical energy at the area of the non-sheet-passing portion of the heater 54 after printing is ended. Then, similarly to the first and second embodiments, the CPU 94 determines the cooling time of the fixing unit 50 based on the risen temperature value at the non-sheet-passing portion of the fixing film 51 being calculated and executes the cooling operation to the fixing unit 50. The above-described explanation illustrates the case where the B5-size sheet was passed, but similar procedures can be taken in a case where an A5-size sheet using the heating elements 541 and 542 and the heating element 544 is passed through. Though it is necessary to change the processing for calculating the accumulated electrical energy of the non-sheet-passing portion of the heating element in the flowchart shown in FIG. 9 illustrating the first embodiment, the flowchart of FIG. 9 can also be applied to the third embodiment.

As described above, according to the present embodiment, even if the heater 54 includes a plurality of heating elements having different lengths, the electrical energy of the non-sheet-passing portion of the entire heater 54 is calculated based on the electrical energy of the non-sheet-passing portion of each of the heating elements. By calculating the electrical energy of the non-sheet-passing portion of the entire heater 54, similarly to the first and second embodiments, the risen temperature value of the non-sheet-passing portion of the fixing member can be calculated accurately based on the accumulated electrical energy of the non-sheet-passing portion of the heating element and the risen temperature saturation value of the non-sheet-passing portion. Thereby, the cooling time of the fixing unit after passing through the small-size sheet can be shortened. Then, by executing the cooling of the fixing member appropriately according to the temperature of the fixing member, the occurrence of a hot offset that may occur when passing through a large-size sheet after passing through a small-size sheet can be reduced.

As described, according to the present embodiment, a period of rotation of the pressure roller for cooling the fixing member can be controlled according to the temperature of the non-sheet-passing portion of the fixing member of the fixing unit.

Fourth Embodiment

According to the first to third embodiments described above, the risen temperature value at the area of the non-sheet-passing portion is calculated based on the electrical energy supplied to the non-sheet-passing portion of the heating elements of the heater, and the cooling time of the fixing unit was determined based on the calculated risen temperature value. The fourth embodiment describes a method for calculating a risen temperature saturation value of the heating elements of the heater by a simple method and determining the cooling time of the fixing unit by setting the calculated risen temperature saturation time as a risen temperature value of the area of the non-sheet-passing portion will be explained. The configurations of the image forming apparatus, the fixing unit, and the heater according to the present embodiment are similar to the third embodiment, so that by assigning the same reference numbers to the same units and members, the descriptions thereof are omitted.

Relationship between Usage Proportions of Heating Elements and Risen Temperature Saturation Value when Passing Through B5-size Sheet Using B5-size sheets, a sheet passing test for confirming the relationship between the usage proportion of the heating elements 541 and 542 and that of the heating element 543 and the risen temperature saturation value at the area of the non-sheet-passing portion of the fixing film 51 was performed. The usage proportions of the heating elements 541 and 542 and the heating element 543 was divided into four patterns according to the warm-up levels 1 to 4 of the fixing unit 50, similarly to Table 1 described earlier. In the sheet passing test, a B5-size sheet having a grammage of 128/m$^2$ was used, temperature control was executed so that the detection temperature of the thermistor 60 arranged in contact with the heater 54 is maintained at 200° C., the sheet conveyance speed was set to 200 mm/sec, and the feed interval of the sheets was set to 0.2 s.

Table 2 is a table that summarizes the results of the sheet passing test of B5-size sheets. Table 2 is composed of warm-up levels (1 to 4) of the fixing unit 50, usage proportions (unit: %) of the heating elements 541 and 542 and the heating element 543 corresponding to the warm-up levels when passing through B5-size sheets, and risen temperature saturation values (unit: ° C.) corresponding to the warm-up level of the area of the non-sheet-passing portion of the fixing film 51. As illustrated in Table 2, the usage proportions of the heating elements 541 and 542 and the heating element 543 according to warm-up level 1 was 50%:50%, and the risen temperature saturation value was 227° C. Similarly, the usage proportions of the heating elements 541 and 542 and the heating element 543 according to warm-up level 2 was 30%:70%, and the risen temperature saturation value at that time was 211° C. Moreover, the usage proportions of the heating elements 541 and 542 and the heating element 543 according to warm-up level 3 was 20%:80%, and the risen temperature saturation value at that time was 203° C. The usage proportions of the heating elements 541 and 542 and the heating element 543 according to warm-up level 4 was 10%:90%, and the risen temperature saturation value was 195° C.

TABLE 2

| FIXING | USAGE PROPORTION OF HEATING ELEMENT [%] | | RISEN |
|---|---|---|---|
| UNIT WARM-UP LEVEL | HEATING ELEMENTS 541, 542 | HEATING ELEMENT 543 | TEMPERATURE SATURATION VALUE [° C.] |
| 1 | 50 | 50 | 227 |
| 2 | 30 | 70 | 211 |
| 3 | 20 | 80 | 203 |
| 4 | 10 | 90 | 195 |

Figure 15A:
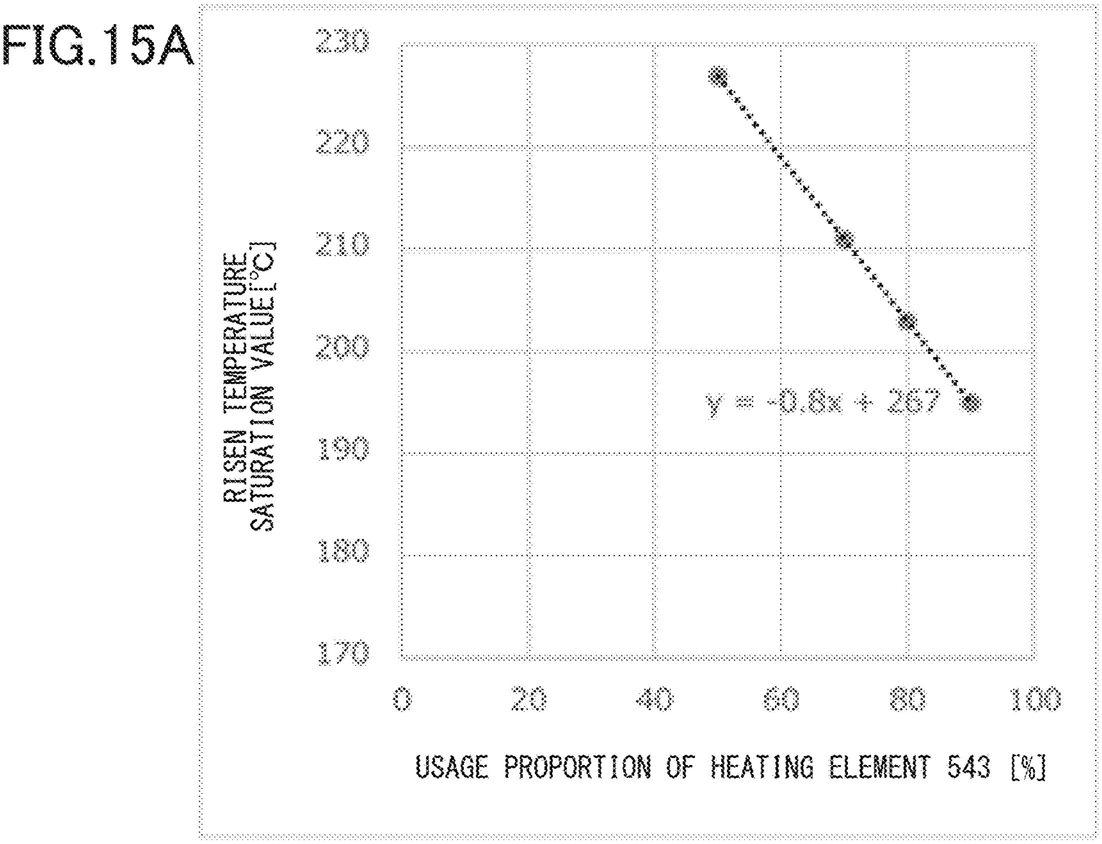
FIGS. 15A and 15B are explanatory views illustrating a relational expression 4 according to a fourth embodiment.

FIG. 15A is a graph plotting risen temperature saturation values corresponding to the usage rate of the heating element 543 shown in Table 2, wherein the vertical axis indicates a risen temperature saturation value (unit: ° C.) of the fixing film 51, and the horizontal axis indicates usage rate (unit: %) of the heating element 543. As illustrated in FIG. 15A, it can be recognized that there is a high correlation between the usage rate of the heating element 543 and the risen temperature saturation value. If a straight line connecting the points plotted in FIG. 15A is defined as a relational expression 4 of a case where B5-size sheets are passed through, the relational expression 4 can be represented by Y=−0.8X+267 when the usage rate of the heating element 543 is X and the risen temperature saturation value is Y.

Relationship between Usage Proportions of Heating Elements and Risen Temperature Saturation Value when Passing Through A5-size Sheet Using A5-size sheets, a sheet passing test for confirming the relationship between the usage proportions of the heating elements 541 and 542 and the heating element 544 and the risen temperature saturation value at the area of the non-sheet-passing portion of the fixing film 51 was performed. The usage proportions of the heating elements 541 and 542 and the heating element 544 was divided into four patterns according to the warm-up levels 1 to 4 of the fixing unit 50, similarly to Table 1 described earlier. In the sheet passing test, an A5-size sheet having a grammage of 128 g/m$^2$ was used, temperature control was executed so that the detection temperature of the thermistor 60 arranged in contact with the heater 54 is maintained at 200° C., the sheet conveyance speed was set to 200 mm/sec, and the feed interval of the sheets was set to 0.2 s.

Table 3 is a table that summarizes the results of the sheet passing test of A5-size sheets. Table 3 is composed of warm-up levels (1 to 4) of the fixing unit 50, usage proportions (unit: %) of the heating elements 541 and 542 and the heating element 544 corresponding to the warm-up levels when passing through A5-size sheets, and risen temperature saturation values (unit: ° C.) corresponding to the warm-up level of the area of the non-sheet-passing portion of the fixing film 51. As illustrated in Table 3, the usage proportions of the heating elements 541 and 542 and the heating element 544 according to warm-up level 1 was 50%:50%, and the risen temperature saturation value was 220° C. Similarly, the usage proportions of the heating elements 541 and 542 and the heating element 544 according to warm-up level 2 was 30%:70%, and the risen temperature saturation value at that time was 204° C. Moreover, the usage proportions of the heating elements 541 and 542 and the heating element 544 according to warm-up level 3 was 20%:80%, and the risen temperature saturation value at that time was 196° C. The usage proportions of the heating elements 541 and 542 and the heating element 544 according to warm-up level 4 was 10%:90%, and the risen temperature saturation value was 185° C.

TABLE 3

| FIXING | USAGE PROPORTION OF HEATING ELEMENT [%] | | RISEN |
|---|---|---|---|
| UNIT WARM-UP LEVEL | HEATING ELEMENTS 541, 542 | HEATING ELEMENT 544 | TEMPERATURE SATURATION VALUE [° C.] |
| 1 | 50 | 50 | 220 |
| 2 | 30 | 70 | 204 |
| 3 | 20 | 80 | 196 |
| 4 | 10 | 90 | 185 |

Figure 15B:
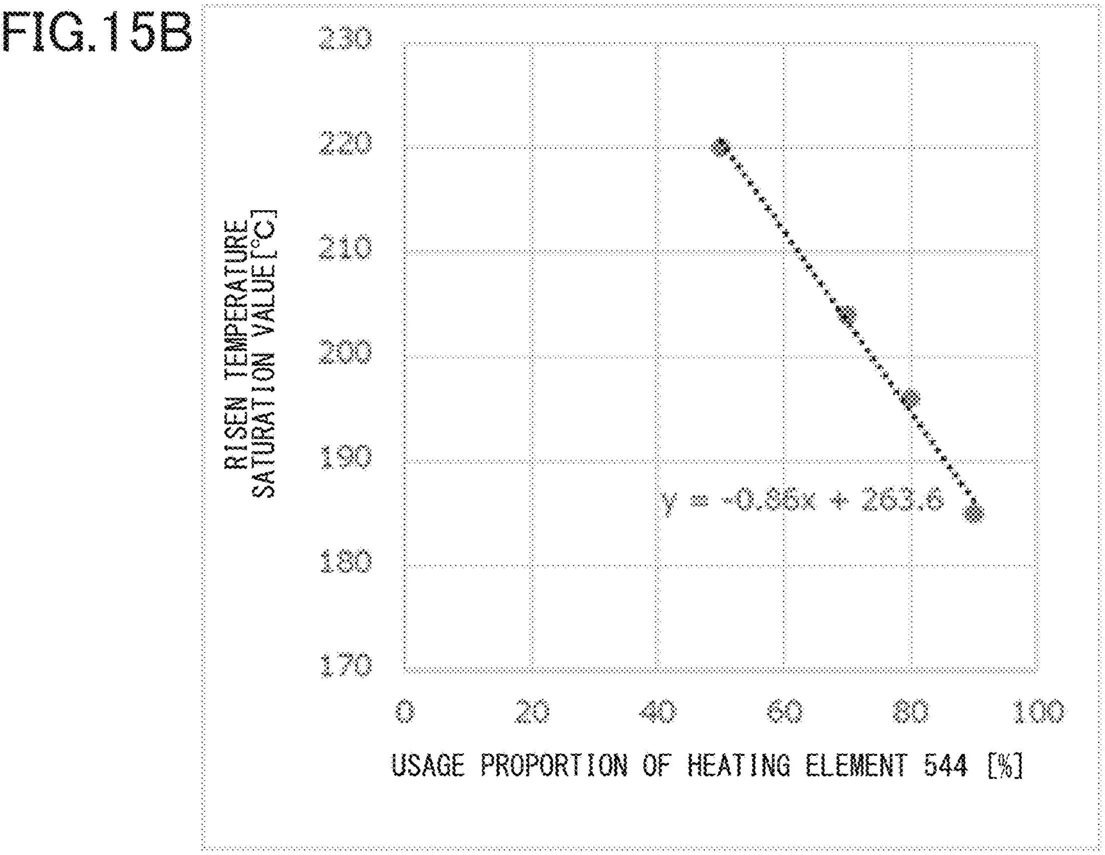

FIG. 15B is a graph plotting risen temperature saturation values corresponding to the usage rate of the heating element 544 shown in Table 3, wherein the vertical axis indicates a risen temperature saturation value (unit: ° C.) of the fixing film 51, and the horizontal axis indicates usage rate (unit: %) of the heating element 544. As illustrated in FIG. 15B, it can be recognized that there is a high correlation between the usage rate of the heating element 544 and the risen temperature saturation value. If a straight line connecting the points plotted in FIG. 15B is defined as a relational expression 4, i.e., third calculation formula, of a case where A5-size sheets are passed through, the relational expression 4 can be represented by Y=−0.86X+263.6 when the usage rate of the heating element 544 is X and the risen temperature saturation value is Y.

Also regarding sheets of other sizes, the sheet passing test is performed in a similar method, and the relational expression 4 corresponding to each of the sheets is calculated. Then, the calculated relational expression is stored in the memory 95 including relational expressions 4 for the B5-size and A5-size sheets. According to the present embodiment, the risen temperature saturation value at the non-sheet-passing portion of the fixing film 51 is calculated based on the relational expression 4 stored in advance in the memory 95 and the usage proportions of the heating elements 543 and 544 according to the warm-up level. Then, the calculated risen temperature saturation value is set as the risen temperature value of the non-sheet-passing portion of the fixing film 51, and the cooling time corresponding to the risen temperature value of the non-sheet-passing portion is determined.

Control Sequence of Cooling of Fixing Unit

Figure 16:
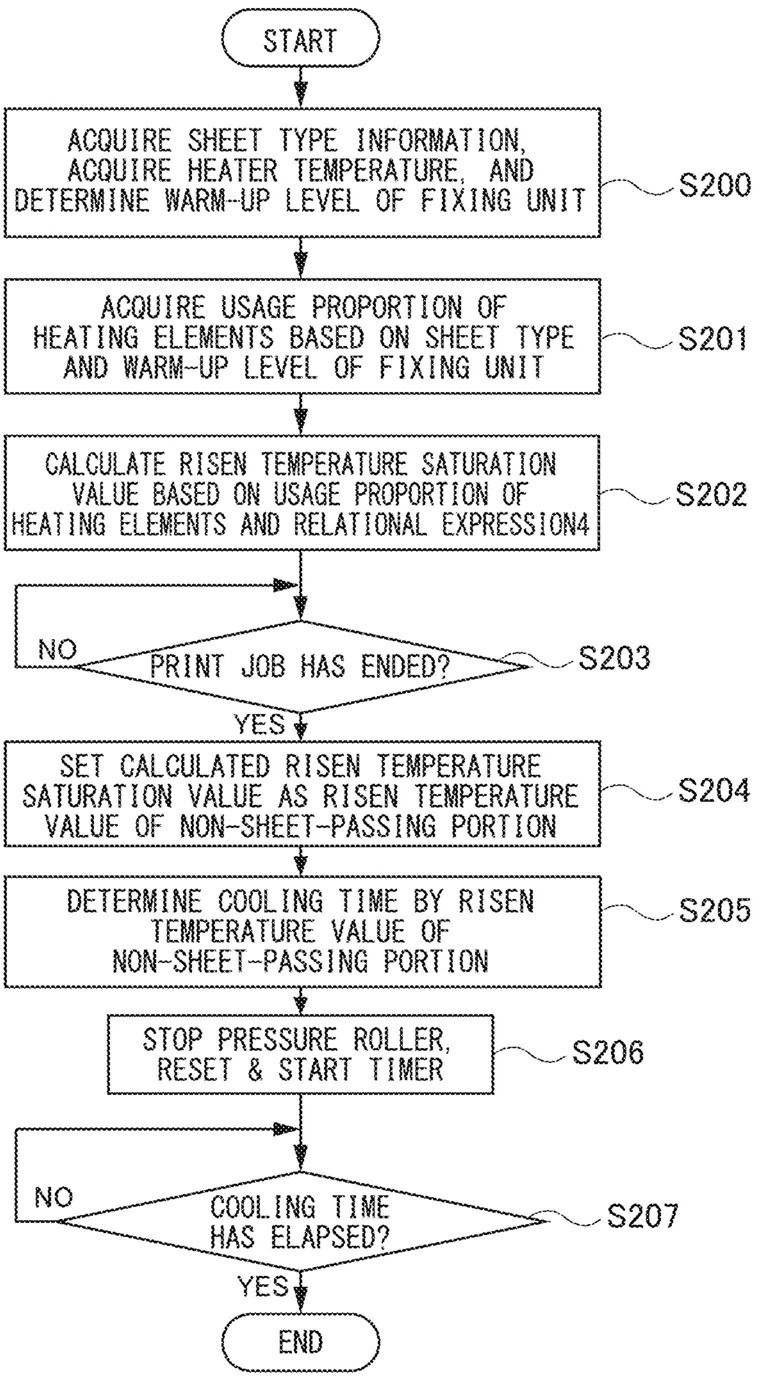
FIG. 16 is a flowchart illustrating a control sequence for cooling a fixing unit according to the fourth embodiment.

FIG. 16 is a flowchart illustrating a control sequence of cooling for lowering the risen temperature value of the non-sheet-passing portion of the fixing film 51 of the fixing unit 50 according to the present embodiment. The procedure illustrated in FIG. 16 is started and executed by the CPU 94 when printing to the sheet P is performed. The CPU 94 performs temperature control of the fixing film 51 of the fixing unit 50 by controlling the power supply to the heating elements 541, 542, 543, and 544 of the heater 54 based on the usage proportions shown in Tables 2 and 3 mentioned above. Further, the temperature control of the fixing film 51 of the fixing unit 50 is executed by a different processing as the processing illustrated in the flowchart of FIG. 16. Further, it is assumed that the information of tables 2 and 3 described above and the relational expression 4 are already stored in the memory 95. Further, it is assumed that the memory 95 stores a table associating the risen temperature value of the non-sheet-passing portion of the fixing film 51 with a cooling time for lowering the temperature of the non-sheet-passing portion of the fixing film 51 to a predetermined temperature. The print job performed by the print command from the PC 110 is assumed to be the print job to the sheets P having the same sheet size.

In S200, the CPU 94 acquires a sheet type information, such as B5-size or A5-size, of the sheet P, based on the information on the sheet P included in the print command received from the video controller 91. Further, the CPU 94 determines the warm-up level (1 to 4) of the fixing unit 50 based on the temperature of the heater 40 detected by the thermistor 60. In S201, the CPU 94 acquires the usage proportions of the heating elements based on table 2 or table 3 stored in the memory 95 based on the sheet type information of the sheet P acquired in S200 and the warm-up level of the fixing unit 50 determined in S200. For example, if the sheet used for the print job is a B5-size sheet, the CPU 94 acquires the usage proportion of the heating element 543 corresponding to the warm-up level of the fixing unit 50 using table 2. Similarly, if the sheet used for the print job is an A5-size sheet, the CPU 94 acquires the usage proportion of the heating element 544 corresponding to the warm-up level of the fixing unit 50 using table 3.

In S202, the CPU 94 reads the relational expression 4 corresponding to the heating element of the usage proportions acquired in S201 from the memory 95 and substitutes the corresponding usage proportions of the heating elements to the relational expression 4, by which the risen temperature saturation value of the fixing film 51 is calculated. In S203, the CPU 94 determines whether the print job has ended, wherein if it is determined that the print job has ended, the procedure advances to S204, and if it is determined that the print job is not ended, the procedure returns to S203.

In S204, the CPU 94 determines the risen temperature saturation value of the fixing film 51 calculated in S202 as the risen temperature value of the area of the non-sheet-passing portion of the fixing film 51. In S205, the CPU 94 acquires the cooling time corresponding to the risen temperature value of the non-sheet-passing portion of the fixing film 51 determined in S204 from the table associating the risen temperature value of the non-sheet-passing portion of the fixing film 51 stored in the memory 95 with the cooling time of the fixing film 51.

In S206, the CPU 94 stops the pressure roller 53 of the fixing unit 50, and resets and start the timer. In S207, the CPU 94 refers to the timer, and determines whether the timer value has passed the cooling time. If the CPU 94 determines that the timer value has not passed the cooling time, the procedure returns to S207, and if it determines that the timer value has exceeded the cooling time, the procedure is ended. During the cooling time, a process of stopping rotation of the pressure roller 53 to lower the temperature of the non-sheet-passing portion of the fixing film 51 was performed. Alternatively, during cooling time, it is possible to rotate the pressure roller 53 to lower the temperature of the non-sheet-passing portion of the fixing film 51 and to perform a processing to stop rotation of the pressure roller 53 after the cooling time has elapsed.

As described, according to the present embodiment, the risen temperature saturation value of the fixing film 51 is calculated based on usage proportions of the heating elements determined based on the sheet size being used and the warm-up level of the fixing unit, and the calculated risen temperature saturation value is set as the risen temperature value of the non-sheet-passing portion. According to the fourth embodiment, the risen temperature value of the non-sheet-passing portion of the fixing film 51 is determined by a simple method, so that the accuracy of the risen temperature value of the non-sheet-passing portion is deteriorated and the cooling time is elongated compared to the first to third embodiments described earlier. However, since the cooling time corresponding to the warm-up level of the fixing unit 50 is ensured, the occurrence of hot offsets can be reduced.

As described above, according to the present embodiment, the period of rotation of the pressure roller for cooling the fixing member can be controlled according to the temperature of the non-sheet-passing portion of the fixing members of the fixing unit.

According to the technique of the present disclosure, the period of rotation of the pressure roller for cooling the fixing member can be controlled according to the temperature of the non-sheet-passing portion of the fixing members of the fixing unit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-040563, filed on Mar. 12, 2021, which is hereby incorporated by reference herein in its entirety.

What is claimed is:

1. An image forming apparatus comprising:

an image forming unit configured to form an image on a sheet;

a fixing unit configured to perform a fixing process to fix the image formed on the sheet by the image forming unit to the sheet, the fixing unit including a tubular film, a pressing roller arranged in contact with an outer surface of the film and configured to form a nip portion, and a heater arranged inside the film and including a first heating element and a second heating element whose length in a longitudinal direction of the film is shorter than a length of the first heating element in the longitudinal direction;

a switch configured to switch supply and cut-off of power supply to the first heating element and the second heating element; and a controller configured to execute following steps of selecting the first heating element and the second heating element in a case where the fixing unit fixes an image to a first sheet having a first size whose length in the longitudinal direction is shorter than the length of the first heating element in the longitudinal direction, determining usage proportions of the first heating element and the second heating element, and controlling the switch such that a heating element to be supplied with electric power is exclusively switched between the first heating element and the second heating element in accordance with the usage proportions, and determining a cooling time for cooling the film after the first sheet having the first size passes the nip portion in a case where the fixing process is to be performed on a second sheet having a second size after the fixing process is performed on the first sheet having the first size, a length of the second size in the longitudinal direction being longer than the length of the first size in the longitudinal direction, the cooling time being determined based on the usage proportions.

2. The image forming apparatus according to claim 1, wherein the cooling time is a period in which a portion of the film corresponding to a non-sheet passing area of the nip portion is cooled, the non-sheet passing area being an area in the longitudinal direction where the first sheet having the first size does not pass.

3. The image forming apparatus according to claim 1, wherein the controller is configured to cause the image forming unit to start forming the image on the second sheet having the second size such that the fixing process is performed on the second sheet having the second size after the cooling time has elapsed.

4. The image forming apparatus according to claim 1, further comprising:

a sensor configured to detect a temperature of the heater, wherein the controller is configured to determine the usage proportions in accordance with the temperature detected by the sensor.

5. The image forming apparatus according to claim 1, wherein the controller is configured to determine the cooling time such that the cooling time is longer as one of the usage proportions for the first heating element is larger.

6. The image forming apparatus according to claim 1, further comprising:

a conveyance roller configured to convey a sheet in a sheet conveyance direction toward the fixing unit, wherein the length of the second size in a sheet width direction orthogonal to the sheet conveyance direction corresponds to the length of the first heating element in the longitudinal direction, and wherein the length of the first size in the sheet width direction corresponds to the length of the second heating element in the longitudinal direction.

7. The image forming apparatus according to claim 1, wherein the controller is configured to cause rotation of the pressing roller to be stopped during the cooling time.

8. The image forming apparatus according to claim 1, wherein the heater further includes a third heating element whose length in the longitudinal direction is shorter than the length of the second heating element.

* * * * *